(12) United States Patent
Edge

(10) Patent No.: US 10,939,239 B2
(45) Date of Patent: Mar. 2, 2021

(54) SYSTEMS AND METHODS FOR COEXISTENCE OF DIFFERENT LOCATION SOLUTIONS FOR FIFTH GENERATION WIRELESS NETWORKS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/180,333

(22) Filed: Nov. 5, 2018

(65) Prior Publication Data

US 2019/0141482 A1 May 9, 2019

Related U.S. Application Data

(60) Provisional application No. 62/582,314, filed on Nov. 6, 2017.

(51) Int. Cl.
*H04W 4/00* (2018.01)
*H04W 4/029* (2018.01)
*H04W 36/14* (2009.01)
*H04W 36/00* (2009.01)
*H04W 4/90* (2018.01)
*H04W 36/08* (2009.01)

(52) U.S. Cl.
CPC .............. *H04W 4/029* (2018.02); *H04W 4/90* (2018.02); *H04W 36/0066* (2013.01); *H04W 36/08* (2013.01); *H04W 36/14* (2013.01)

(58) Field of Classification Search
CPC . H04W 4/029; H04W 36/14; H04W 36/0066; H04W 4/90; H04W 36/08; H04W 4/02
USPC ........................................................ 370/331
See application file for complete search history.

(56) References Cited

U.S. PATENT DOCUMENTS

2010/0202407 A1* 8/2010 Edge ................... H04W 36/385
370/331
2010/0284366 A1* 11/2010 Zhu ......................... H04W 4/90
370/331

(Continued)

OTHER PUBLICATIONS

Location Services Alternatives for 5G System Architecture and 5G Procedures Discusssion, Jan. 16-20, 2017 (Year: 2017).*

(Continued)

*Primary Examiner* — Chuong T Ho
(74) *Attorney, Agent, or Firm* — Paradice and Li LLP

(57) ABSTRACT

Methods and techniques are described for supporting different location solutions in a wireless network (e.g. a 5G network) in which two different location solutions coexist in the same wireless network, and where a network operator may migrate network support from one location solution to the other. For location support of emergency calls, handover of an emergency call can be supported from a network node (e.g. an AMF) that supports one location solution to a network node (e.g. another AMF) that supports the other location solution. The handover may be supported by transferring indications of the handover between network nodes (e.g. including a GMLC, AMF and/or an LMF) to enable reconfiguration of location support for the emergency call at an LRF and GMLC from one location solution to the other.

32 Claims, 12 Drawing Sheets

(56) References Cited

U.S. PATENT DOCUMENTS

| | | | | |
|---|---|---|---|---|
| 2010/0311386 | A1* | 12/2010 | Edge | H04W 36/0022 455/404.1 |
| 2016/0249193 | A1* | 8/2016 | Edge | H04W 4/90 |
| 2020/0037145 | A1* | 1/2020 | Gunnarsson | H04W 64/00 |

OTHER PUBLICATIONS

QUALCOMM Incorporated: "Location Services Alternatives for 5G System Architecture and 5G Procedures", 3GPP Draft; S2-171982, 3rd Generation Partnership Project (3GPP), Mobile Competence Centre, 650, Route Des Lucioles, F-06921, Sophia-A, vol. SA WG2, No. Busan, South Korea; Mar. 26, 2017 (Mar. 26, 2017), XP051247716, Retrieved from the Internet: URL:http://www.3gpp.orgjftp/Meetings_3GPP_SYNC/SA2/Docs/, pp. 30.

International Search Report and Written Opinion—PCT/US2018/059356—ISA/EPO—dated Jan. 8, 2019.

QUALCOMM Incorporated, et al: "5G System Procedures for Location Support of Emergency Services," 3GPP Draft; S2-177256_P-CR for TS 23.502 for 5G System Procedures for Location-V7, 3rd Generation Partnership Project (3GPP), Mobile Competence Centre; 650, Route Des Lucioles; F-06921 Sophia-Antipolis, vol. SA WG2, No. Ljubljana, Slovenia; Oct. 23, 2017-Oct. 27, 2017, Oct. 22, 2017, XP051347212, 22 pages, Retrieved from the Internet: URL: http://www.3gpp.org/ftp/Meetings_3GPP_SYNC/SA2/Docs/ [retrieved on Oct. 22, 2017].

QUALCOMM Incorporated: "Location Continuity for Emergency Call Handover between E-UTRAN and WLAN," 3GPP Draft; 23271_CRO425R1_TE114SEW2_(REL-14)_S2-171241 (CR to TS 23.271 for Location Continuity for SEW2)—R1, 3rd Generation Partnership Project (3GPP), Mobile Competence Centre; 650, Route Des Luc, vol. SA WG2, No. Dubrovnik, Croatia; Feb. 13, 2017-Feb. 17, 2017, Mar. 4, 2017, XP051234964, 14 pages, Retrieved from the Internet: URL: http://www.3gpp.org/ftp/Meetings_3GPP_SYNC/SA/Docs/ [retrieved on Mar. 4, 2017].

* cited by examiner

SYSTEMS AND METHODS FOR COEXISTENCE OF DIFFERENT LOCATION SOLUTIONS FOR FIFTH GENERATION WIRELESS NETWORKS

CLAIM OF PRIORITY UNDER 35 U.S.C. § 119

This application claims under 35 USC § 119 the benefit of and priority to U.S. Provisional Application No. 62/582,314, filed Nov. 6, 2017, and entitled "Systems And Methods For Coexistence Of Different Location Solutions For Fifth Generation Wireless Networks," which is assigned to the assignee hereof and is incorporated herein by reference in its entirety.

BACKGROUND

Background Field

The present disclosure relates generally to communication, and more specifically to techniques for supporting location services for user equipments (UEs).

Relevant Background

Two different control plane (CP) location solutions have been identified for a 5G Core Network (5GCN) for the Third Generation Partnership Project (3GPP). One solution, referred to here as "Solution A", is similar to the CP location solution already defined for Long Term Evolution (LTE) access for 3GPP and uses an Access and Mobility Management Function (AMF) in place of a Mobility Management Entity (MME) and a Location Management Function (LMF) in place of an Enhanced Serving Mobile Location Center (E-SMLC) and with a corresponding allocation of location functions. The other solution, referred to here as "Solution B", uses an AMF and LMF as in Solution A, but moves most location related functions to the LMF with minimal location related functions in the AMF. In the event that both location solutions are standardized for 3GPP, it could be beneficial to reduce the amount of standardization by identifying and utilizing common aspects of both solutions. It could also be beneficial to enable a wireless network operator to migrate from one solution to the other or support both solutions during a migration phase or for different location applications in an efficient manner.

SUMMARY

Methods and techniques are described for supporting different location solutions in a wireless network (e.g. a 5G network) in which two different location solutions coexist in the same wireless network, and where a network operator may migrate network support from one location solution to the other. For location support of emergency calls, handover of an emergency call can be supported from a network node (e.g. an AMF) that supports one location solution to a network node (e.g. another AMF) that supports the other location solution. The handover may be supported by transferring indications of the handover between network nodes (e.g. including a GMLC, AMF and/or an LMF) to enable reconfiguration of location support for the emergency call at an LRF and GMLC from one location solution to the other.

In one implementation, a method at a first network node in a wireless core network for supporting location of a user equipment (UE) according to a first location solution includes receiving a first indication of a handover of an emergency call for the UE, wherein the handover is to or from a second network node in the wireless core network, wherein the second network node supports location of the UE according to a second location solution different from the first location solution; and sending a second indication of the handover of the emergency call to a third network node in the wireless core network, wherein the third network node supports the first location solution.

In one implementation, a first network node in a wireless core network for supporting location of a user equipment (UE) according to a first location solution, the first network node includes an external interface configured to communicate with nodes in the wireless core network; a memory to store instructions; and at least one processor coupled to the external interface and the memory and configured to receive a first indication of a handover of an emergency call for the UE, wherein the handover is to or from a second network node in the wireless core network, wherein the second network node supports location of the UE according to a second location solution different from the first location solution, and to send a second indication of the handover of the emergency call to a third network node in the wireless core network, wherein the third network node supports the first location solution.

In one implementation, a first network node in a wireless core network for supporting location of a user equipment (UE) according to a first location solution, the first network node includes means for receiving a first indication of a handover of an emergency call for the UE, wherein the handover is to or from a second network node in the wireless core network, wherein the second network node supports location of the UE according to a second location solution different from the first location solution; and means for sending a second indication of the handover of the emergency call to a third network node in the wireless core network, wherein the third network node supports the first location solution.

In one implementation, a storage medium including program code stored thereon, the program code is operable to cause at least one processor in a first network node in a wireless core network supporting location of a user equipment (UE) according to a first location solution to perform receiving a first indication of a handover of an emergency call for the UE, wherein the handover is to or from a second network node in the wireless core network, wherein the second network node supports location of the UE according to a second location solution different from the first location solution; and sending a second indication of the handover of the emergency call to a third network node in the wireless core network, wherein the third network node supports the first location solution.

BRIEF DESCRIPTION OF THE DRAWINGS

An understanding of the nature and advantages of various embodiments may be realized by reference to the following figures.

Like reference numbers and symbols in the various figures indicate like elements, in accordance with certain example implementations. In addition, multiple instances of an element may be indicated by following a first number for the element with a hyphen and a second number or by a letter. For example, multiple instances of an element 110 may be indicated as 110-1, 110-2, 110-3 etc. or as 110A, 110B, 110C etc. When referring to such an element using only the first number, any instance of the element is to be understood (e.g. element 110 in the previous example would refer to elements 110-1, 110-2 and 110-3 or to elements 110A, 110B and 110C).

DETAILED DESCRIPTION

Two different control plane (CP) location solutions have been identified for a 5G Core Network (5GCN) for the Third Generation Partnership Project (3GPP). One solution, referred to here as "Solution A", is similar to the CP location solution already defined for Long Term Evolution (LTE) access for 3GPP and uses an Access and Mobility Management Function (AMF) in place of a Mobility Management Entity (MME) and a Location Management Function (LMF) in place of an Enhanced Serving Mobile Location Center (E-SMLC) and with a corresponding allocation of location functions. The other solution, referred to here as "Solution B", uses an AMF and LMF as in Solution A, but moves most location related functions to the LMF with minimal location related functions in the AMF.

Embodiments described herein can enable use of common protocols and common procedures for Solutions A and B that could be standardized once only for both solutions. These protocols and procedures could be used between a Gateway Mobile Location Center (GMLC) and an AMF for Solution A and between a GMLC and LMF for Solution B. The common protocols and procedures could allow an identical or almost identical GMLC implementation to support both solutions, thereby reducing network impact in any migration from one solution to the other. Embodiments described herein also enable both solutions to coexist in the same network with some small restrictions and can enable continuity of location for an emergency (EM) call that undergoes handover from an AMF supporting one solution to an AMF supporting the other solution. For example, a solution X, where X corresponds to A or B, may support continuity of location for EM call handover to or from another AMF supporting the other solution Y (where Y corresponds to B or A) in the same way as solution X would support continuity of location for EM call handover to or from a different RAN. More details of this are provided below.

Figure 1A:
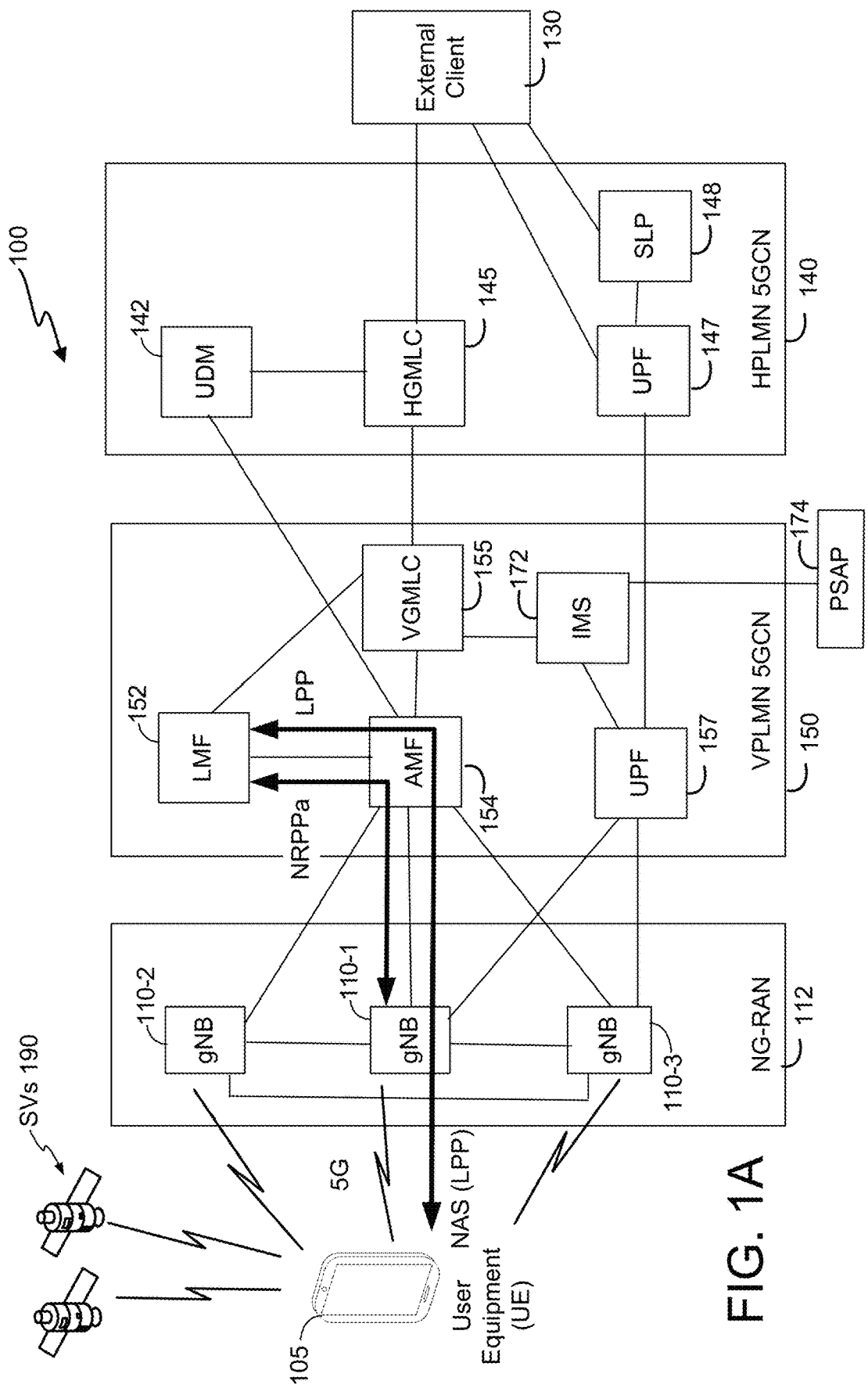
FIGS. 1A-1C shows diagrams of a communication system enabling coexistence of different location solutions for a Fifth Generation (5G) wireless network.

FIG. 1A shows a diagram of a communication system architecture 100, according to an embodiment. The communication system 100 may be configured to implement coexistence of different location solutions for a 5G wireless network such as coexistence of Solutions A and B. Here, the communication system 100 comprises a user equipment (UE) 105, and components of a 5G network comprising a Next Generation RAN (NG-RAN) 112 for a Visited Public Land Mobile Network (VPLMN), a VPLMN 5G Core Network (5GCN) 150 and a home network 5GCN 140. The home network 5GCN 140 is for a Home Public Land Mobile Network (HPLMN) for the UE 105 and communicates with the 5GCN 150 for the VPLMN, which in turn communicates with the UE 105. A 5G network may also be referred to as a New Radio (NR) network; NG-RAN 112 may be referred to as an NR RAN or a 5G RAN; and 5GCN 140 and 150 may be referred to as an NG Core network (NGC). Standardization of an NG-RAN and 5GCN is ongoing in 3GPP. Accordingly, NG-RAN 112 and 5GCN 140 and 150 may conform to current or future standards for 5G support from 3GPP. The communication system 100 may further utilize information from satellite vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

It should be noted that FIG. 1A provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, gNBs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1A illustrates a 5G-based network, similar network implementations and configurations may be used for other communication technologies, such as 3G, Long Term Evolution (LTE) (also referred to as 4G), IEEE 802.11 WiFi etc.

The UE 105 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 140, 150), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements of 5GCN 140, 150 not shown in FIG. 1A, or possibly via a Gateway Mobile Location Center (GMLC) 145 or 155) and/or allow the external client 130 to receive location information regarding the UE 105 (e.g., via the GMLC 145 or 155).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) in the NG-RAN 112 shown in FIG. 1A comprise NR NodeBs, also referred to as gNBs, 110-1, 110-2 and 110-3 (collectively and generically referred to herein as gNBs 110). Pairs of gNBs 110 in NG-RAN 112 may be connected to one another—e.g. directly as shown in FIG. 1A or indirectly via other gNBs 110. Access to the 5G network is provided to UE 105 via wireless communication between the UE 105 and one or more of the gNBs 110, which may provide wireless communications access to the 5GCN 150 on behalf of the UE 105 using 5G NR. In FIG. 1A, the serving gNB for UE 105 is assumed to be gNB 110-1, although other gNBs (e.g. gNB 110-2 and/or gNB 110-3) may act as a serving gNB if UE 105 moves to another location or may act as a secondary gNB to provide additional throughout and bandwidth to UE 105. Some gNBs 110 in FIG. 1A (e.g. gNB 110-2 or gNB 110-3) may be configured to function as positioning-only beacons which may transmit signals (e.g. a positioning reference signal (PRS)) to assist positioning of UE 105 but may not receive signals from UE 105 or from other UEs.

As noted, while FIG. 1A depicts nodes configured to communicate according to 5G communication protocols, nodes configured to communicate according to other communication protocols, such as, for example, an LTE protocol, may be used. Such nodes, configured to communicate using different protocols, may be controlled, at least in part, by the 5GCN 150. Thus, the NG-RAN 112 may include any combination of gNBs, evolved Node Bs (eNBs) that support LTE access, or other types of base stations or access points. As an example, NG-RAN 112 may include one or more next generation eNBs (ng-eNBs) which provide LTE wireless access to UE 105 and which may connect to entities in 5GCN 150 such as AMF 154 and UPF 157.

The gNBs 110 can communicate with an Access and Mobility Management Function (AMF) 154, which, for positioning functionality, communicates with a Location Management Function (LMF) 152. The AMF 154 may support access and mobility of the UE 105, including registration of UE 105, cell change and handover and may participate in supporting a signaling connection to the UE 105 and possibly helping establish and release Protocol Data Unit (PDU) sessions for UE 105. Other functions of AMF 154 may include: termination of a control plane (CP) interface from NG-RAN 112; termination of Non-Access Stratum (NAS) signaling connections from UEs such as UE 105, NAS ciphering and integrity protection; registration management; connection management; reachability management; mobility management; access authentication and authorization.

The LMF 152 may support positioning of the UE 105 when UE 105 accesses the NG-RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), angle of departure (AOD), angle of arrival (AOA), and other position methods. The LMF 152 may also process location services requests for the UE 105, e.g., received from the AMF 154 or from the Visited GMLC (VGMLC) 155. In some embodiments, a node/system that implements the LMF 152 may additionally or alternatively implement other types of location-support modules, such as an Enhanced Serving Mobile Location Center (E-SMLC) or a Secure User Plane Location (SUPL) Location Platform (SLP). It is noted that in some embodiments, at least part of the positioning functionality (including derivation of UE 105's location) may be performed at the UE 105 (e.g., using signal measurements for signals transmitted by wireless nodes, and assistance data provided to UE 105).

The VGMLC 155 may support a location request for the UE 105 received from an external client 130 or from Home GMLC (HGMLC) 145 and may forward such a location request to the AMF 154 for forwarding by the AMF 154 to the LMF 152 or may forward the location request directly to the LMF 152. A location response from the LMF 152 (e.g. containing a location estimate for the UE 105) may be similarly returned to VGMLC 155 either directly or via the AMF 154, and the VGMLC 155 may then return the location response (e.g., containing the location estimate) to the external client 130 or to HGMLC 145. The VGMLC 155 is shown connected to both the AMF 154 and LMF 152, but only one of these connections may be supported by 5GCN 150 in some implementations.

As further illustrated in FIG. 1A, the LMF 152 and the gNBs 110 may communicate using a New Radio Position Protocol A (which may be referred to as NPPa or NRPPa). NRPPa may be defined in 3GPP Technical Specification (TS) 38.455 and may be the same, similar to, or an extension of the LTE Positioning Protocol A (LPPa) defined in 3GPP TS 36.455, with NRPPa messages being transferred between the gNBs 110 and the LMF 152 via the AMF 154. As further illustrated in FIG. 1A, LMF 152 and UE 105 may communicate using the LTE Positioning Protocol (LPP) defined in 3GPP TS 36.355, where LPP messages are transferred inside NAS transport messages between the UE 105 and the AMF 154 via a serving gNB 110-1 for UE 105. LPP messages may be relayed by AMF 154 and transferred between the LMF 152 and the AMF 154 using a service based interface (SBI), such as an SBI based on use of the HyperText Transfer Protocol (HTTP) over the Internet Protocol (IP). The LPP protocol may be used to support positioning of UE 105 using UE assisted and/or UE based position methods such as A-GNSS, RTK, OTDOA and/or ECID. The NRPPa protocol may be used to support positioning of UE 105 using network based position methods such as ECID (when used with measurements obtained by a gNB 110) and/or may be used by LMF 152 to obtain location related information from gNBs 110 such as parameters defining PRS transmission from gNBs 110 for support of OTDOA.

Information provided by the gNBs 110 to the LMF 152 using NRPPa may include timing and configuration information for PRS transmission and location coordinates of the gNBs 110. The LMF 152 can then provide some or all of this information to the UE 105 as assistance data in an LPP message via the NG-RAN 112 and the AMF 154.

An LPP message sent from the LMF 152 to the UE 105 may instruct the UE 105 to do any of a variety of things, depending on desired functionality. For example, the LPP message could contain an instruction for the UE 105 to obtain measurements for GNSS (or A-GNSS), wireless LAN, and/or OTDOA (or some other position method). In the case of OTDOA, the LPP message may instruct the UE 105 to obtain one or more measurements (e.g. Reference Signal Time Difference (RSTD) measurements) of PRS signals transmitted within particular cells supported by particular gNBs 110 (or supported by one or more ng-eNBs or eNBs). The UE 105 may send the measurements back to the LMF 152 in an LPP message (e.g. inside a 5G NAS transport message) via the serving gNB 110-1 and the AMF 154.

In some embodiments, LPP may be augmented by or replaced by an NR positioning protocol (NPP) which supports position methods such as OTDOA and E-CID for NR radio access. For example, an LPP message may contain an embedded NPP message or may be replaced by an NPP message.

VPLMN 5GCN 150 may also include an IP Multimedia Subsystem (IMS) 172 which may be connected to UPF 157, to VGMLC 155 and to a Public Safety Answering Point (PSAP) 174. IMS 172 may be used for establishing and releasing voice calls, data sessions and/or emergency calls which may be originated by or terminated to UE 105 using the IETF Session Initiation Protocol (SIP). For example, IMS 172 may include a Proxy Call Session Control Function (P-CSCF), a Serving Call Session Control Function (S-CSCF), an Emergency Call Session Control Function (E-CSCF) and/or a Location Retrieval Function (LRF), not shown in FIG. 1A, but possibly as described in 3GPP TSs 23.228 and 23.167.

As illustrated, HPLMN 140 includes a Unified Data Management (UDM) 142 and a Home GMLC (H-GMLC) 145 that may be connected to the VGMLC 155 (e.g., via the Internet), as well as a User Plane Function (UPF) 147 that may be connected to a UPF 157 in the VPLMN 150. The UDM 142 may store subscription data for UE 105 and may perform the following functions: UE authentication, UE identification, access authorization, registration and mobility management and subscription management. UPF 147 and UPF 157 may each support voice and data bearers for UE 105 and may enable UE 105 voice and data access to other networks such as the Internet. UPF 147 and UPF 157 functions may include: external PDU session point of interconnect to a Data Network, packet (e.g. IP) routing and forwarding, packet inspection and user plane part of policy rule enforcement, QoS handling for user plane, downlink packet buffering and downlink data notification triggering.

UPF 147 may be connected to a location server (LS), such as a SUPL Location Platform (SLP) 148. The SLP 148 may support the SUPL user plane (UP) location solution defined by the Open Mobile Alliance (OMA) and may support location services for UE 105 based on subscription information for UE 105 stored in SLP 148. The SLP 148 may be a home SLP (H-SLP) for UE 105. In some embodiments of communication system 100, a Discovered SLP (D-SLP) or Emergency SLP (E-SLP) (not shown in FIG. 1A), in or accessible from VPLMN 5GCN 150 (e.g. connected to UPF 157), may be used to locate UE 105 using the SUPL UP solution. SLP 148 and LMF 152 in communication system architecture 100 are both examples of an LS that may employ the LPP and/or LPP/NPP protocols for positioning of UE 105.

In a CP location solution, such as the 3GPP CP location solution defined in 3GPP TS 23.271 and TS 36.305, signaling (e.g. including LPP, LPP/NPP and other messages) to support location of UE 105 may be transferred between participating entities (e.g. VGMLC 155, gNB 110 and UE 105) using existing signaling interfaces and protocols for VPLMN 5GCN 150 and HPLMN 5GCN 140. In contrast, in a UP location solution such as SUPL, signaling (e.g. such as SUPL messages carrying embedded LPP and/or LPP/NPP messages) to support location of UE 105 may be transferred between participating entities (e.g. UE 105 and SLP 148) using data bearers (e.g. using the Internet Protocol (IP)).

The HGMLC 145 may be connected to UDM 142 for UE 105. HGMLC 145 may provide location access to UE 105 on behalf of external clients such as external client 130. One or more of HGMLC 145, UPF 147, and SLP 148 may be connected to external client 130, e.g., through another network, such as the Internet. In some cases, a Requesting GMLC (R-GMLC) located in another PLMN (not shown in FIG. 1A) may be connected to HGMLC 145 (e.g., via the Internet) in order to provide location access to UE 105 on behalf of external clients connected to the R-GMLC. The R-GMLC, HGMLC 145 and VGMLC 155 may support location access to UE 105 using the 3GPP CP solution defined in 3GPP TS 23.271.

It should be understood that while a VPLMN 150 and a separate HPLMN 140 are illustrated in FIG. 1A, both PLMNs (networks) may be the same PLMN. In that case, (i) SLP 148, UDM 142 and UPF 147 may be in the same 5GCN as AMF 154 and LMF 152, (ii) VGMLC 155 and HGMLC 145 may be the same GMLC and may then be referred to as GMLC 155, and (iii) UPF 147 and UPF 157 may be the same UPF.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GCN 150 may be configured to control different air interfaces, such as the Evolved Universal Terrestrial Radio Access Network (E-UTRAN) comprising one or more evolved Node Bs (eNBs) in place of the gNBs 110. In some other embodiments, both the NG-RAN 112 and the 5GCN 140, 150 may be replaced by other RANs and other core networks. For example, in an Evolved Packet System (EPS) defined by 3GPP to support LTE access: the UE 105 may access the EPS rather than the NG-RAN 112 and 5GCN 140, 150; the NG-RAN 112 may be replaced by an E-UTRAN containing eNBs in place of the gNBs 110; and the 5GCN 140, 150 may be replaced by an Evolved Packet Core (EPC) comprising a Mobility Management Entity (MME) in place of the AMF 154, an Enhanced Serving Mobile Location Center (E-SMLC) in place of the LMF 152 and a GMLC that may be similar to the VGMLC 155. In such an EPS, the E-SMLC may use LPPa in place of NRPPa to send and receive location information to and from the eNBs in the E-UTRAN and may use LPP to support positioning of UE 105. In addition, in some implementations, base stations (e.g. similar to or based on a gNB 110 or eNB) may function as positioning only beacons and transmit signals (e.g. PRS) to assist positioning of a UE 105 but not receive signals from a UE 105.

Figure 1B:
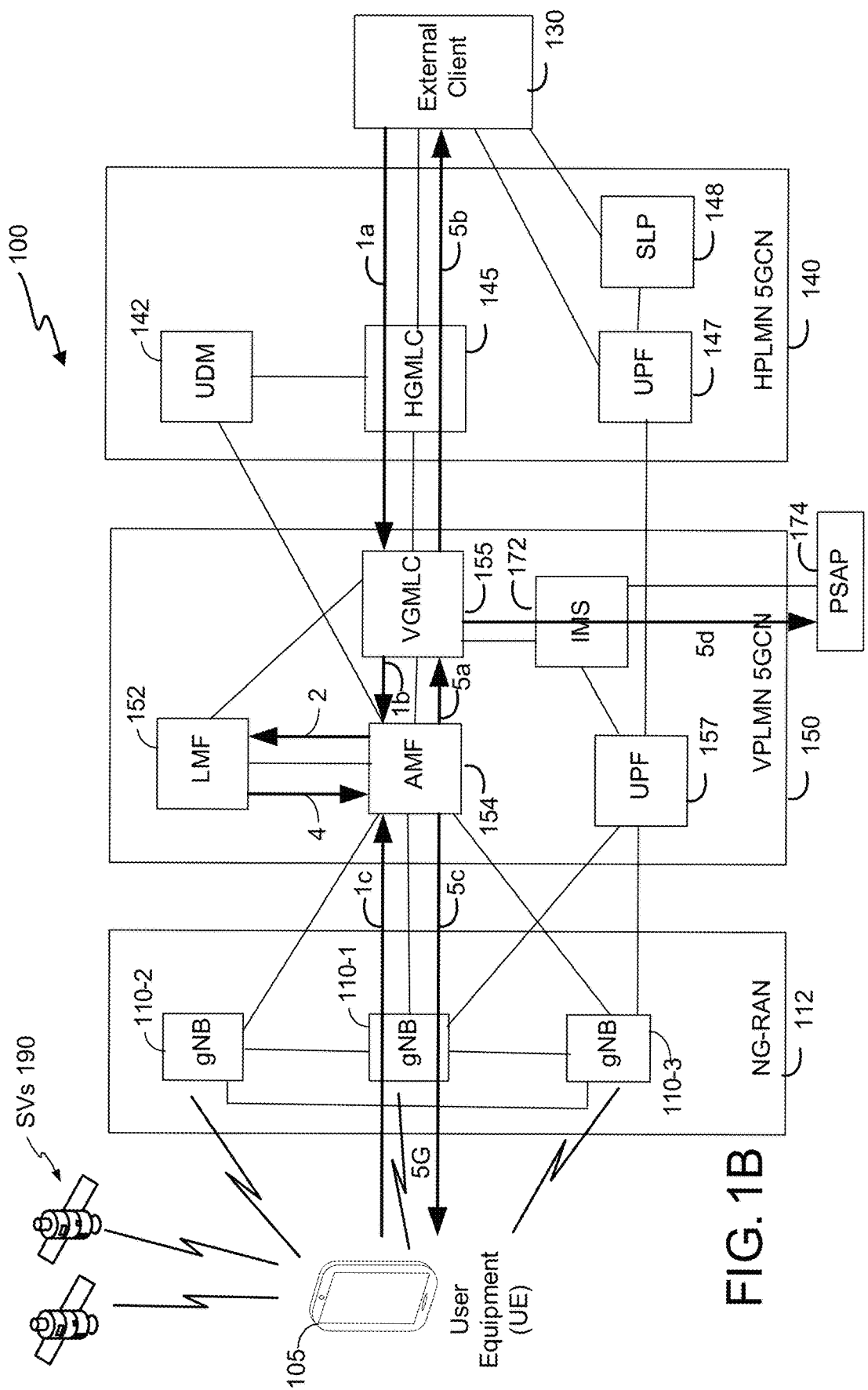

A CP location solution can be supported by the communication system architecture 100 in different ways. FIG. 1B, which incorporates all physical elements from FIG. 1A, shows at a high level the support of CP location according to Solution A. Solution A may be referred to as a "traditional CP location solution" or as an "AMF based location solution", because coordination and control of the location of a UE 105 is performed by AMF 154 (which may perform functions similar to those performed by an MME for the CP location solution for LTE access as defined in 3GPP TS 23.271). As shown in FIG. 1B, a location request for a UE 105 may originate from external client 130, which may be referred to as a "Mobile Terminated Location Request" (MT-LR). For an MR-LR with solution A, a location request is sent by external client 130 to HGMLC 145, which forwards the request (e.g. as part of a signaling message) to VGMLC 155 at a stage 1*a*. VGMLC 155 may then forward the request to AMF 154, which is the serving AMF for UE, at stage 1*b*. The AMF may then send the location request to LMF 152 at stage 2. At a stage 3 which is not shown in FIG. 1B, LMF 152 may exchange LPP or NPP messages with UE 105 and/or may exchange NRPPa messages with gNB 110-1 to obtain location measurements or a location estimate for UE 105, as described earlier for FIG. 1A. LMF 152 may then determine a location estimate for UE 105 (e.g. from location measurements obtained from UE 105 using LPP or NPP and/or from location measurements obtained from gNB 110-1 using NRPPa) and may return the location estimate to AMF 154 at stage 4. AMF 154 then returns the location estimate to VGMLC 155 at stage 5*a* (e.g. as part of a signaling message), and VGMLC 155 returns the location estimate to external client 130 at stage 5*b* via HGMLC 145.

In alternative procedures, which may also be supported by Solution A, and which are also shown in FIG. 1B, a location of UE 105 may be requested by UE 105, which may be referred to as a Mobile Originated Location Request (MO-LR). Alternatively, a location of UE 105 may be instigated within 5GCN 150 due to a request from UE 105 for an emergency call, which may be referred to as a Network Induced Location Request (NI-LR). For an MO-LR with Solution A, UE 105 sends a location request to the serving AMF at stage 1*c* in FIG. 1B. For an NI-LR with Solution A, UE 105 sends a request or an indication of a request for an emergency call to the serving AMF at stage 1*c* in FIG. 1B. Based on the location request for an MO-LR or the request for an emergency call for an NI-LR, AMF 154 sends a location request for UE 105 to LMF 152 at stage 2 which is similar to or the same as stage 2 described previously for an MT-LR for Solution A. For an MO-LR or NI-LR, LMF 152 then performs stages 3 and 4 as described previously for an MT-LR for Solution A. After a location estimate is returned to AMF 154 by LMF 152 at stage 4, and if the location was obtained for an NI-LR, the AMF 154 may send the location estimate for UE 105 to VGMLC 155 at stage 5*a* (e.g. as part of a signaling message), and VGMLC 155 may send the location estimate to PSAP 174 via an LRF in IMS 172 at stage 5*d*. For an NI-LR, the signaling messages used for stages 5*a* and 5*d* may differ from the signaling messages used for steps 5*a* and 5*b* in the case of an MT-LR, and VGMLC 155 may send the location estimate directly to PSAP 174 at stage 5*d* and not via HGMLC 145. Alternatively, if the location was obtained for an MO-LR, then after a location estimate is returned to AMF 154 by LMF 152 at stage 4 in FIG. 1B, the AMF 154 may return the location estimate for UE 105 directly to UE 105 at stage 5*c*. It may be observed that, for all procedures for Solution A (MT-LR, MO-LR and NI-LR), a location request or a request for an EM call which instigates a location request, is first sent to AMF 154 which then forwards the location request to LMF 152 and returns a location estimate to a destination entity. Thus, in Solution A, the AMF 154 is the main controlling entity, while LMF 152 simply obtains and returns a location estimate to AMF 154.

Figure 1C:
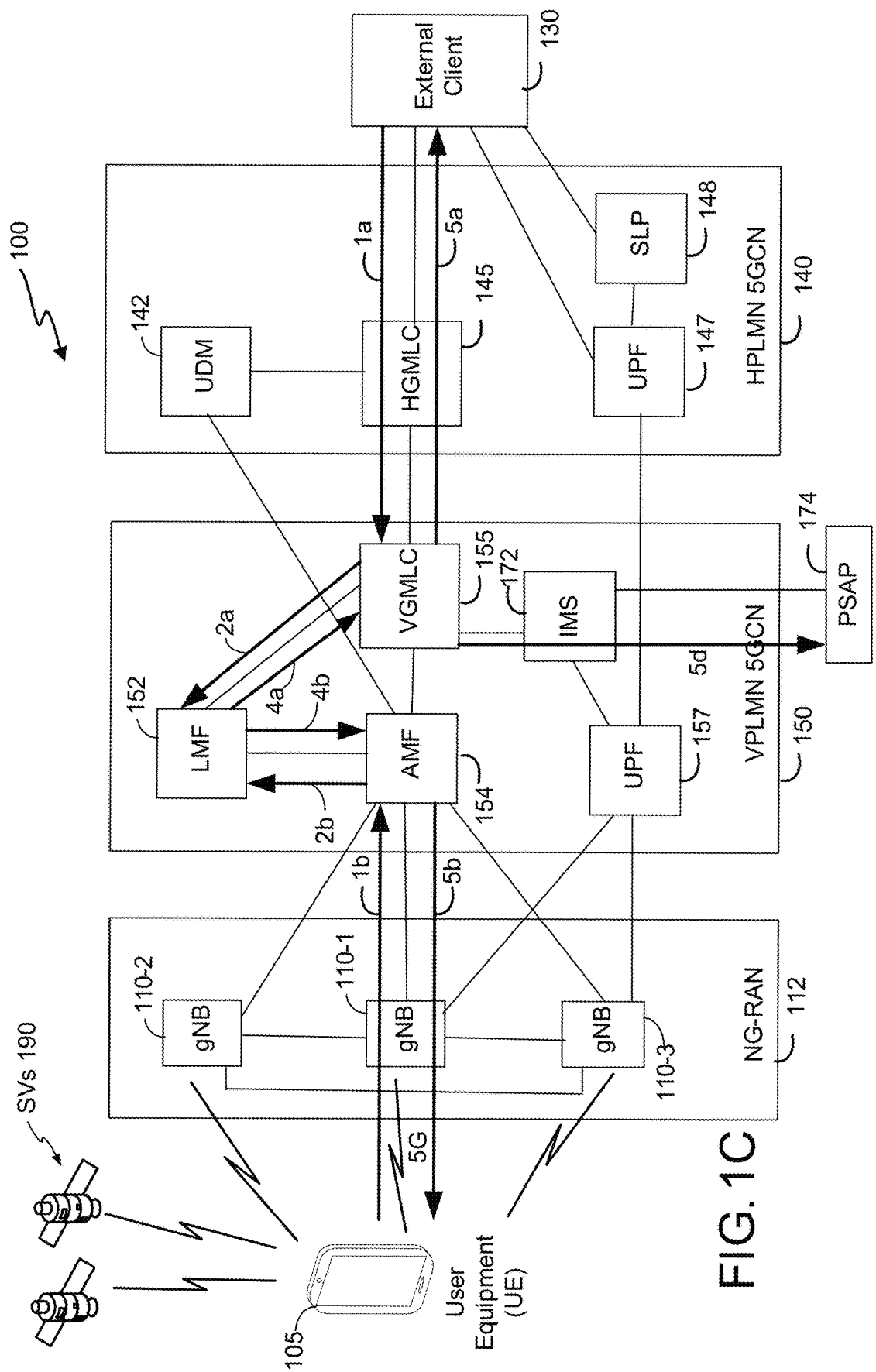

FIG. 1C, which incorporates all physical elements from FIG. 1A, shows at a high level the support of CP location according to Solution B. Solution B may be referred to as an "LMF based location solution", because coordination and control of the location of a UE 105 is performed by LMF 152. As shown in FIG. 1C, a location request for a UE 105 may originate from external client 130, which may be referred to as an MT-LR (as for Solution A). For an MR-LR with solution B, a location request is sent by external client 130 to HGMLC 145, which forwards the request to VGMLC 155 at a stage 1*a*. VGMLC 155 may then forward the request to LMF 152, at stage 2*a* (e.g. as part of a signaling message). At a stage 3 which is not shown in FIG. 1C, LMF 152 may exchange LPP or NPP messages with UE 105 and/or may exchange NRPPa messages with gNB 110-1 to obtain location measurements or a location estimate for UE 105, as described earlier for FIG. 1A. Stage 3 for Solution B in FIG. 1C may be similar to or the same as stage 3 for Solution A in FIG. 1B. LMF 152 may then determine a location estimate for UE 105 (e.g. from location measurements obtained from UE 105 using LPP or NPP and/or from location measurements obtained from gNB 110-1 using NRPPa) and may return the location estimate to VGMLC 155 at stage 4*a* (e.g. as part of a signaling message). VGMLC 155 then returns the location estimate to external client 130 at stage 5*a* via HGMLC 145.

In alternative procedures, which may also be supported by Solution B, and which are also shown in FIG. 1C, a location of UE 105 may be requested by UE 105, which may be referred to as an MO-LR (as for Solution A). Alternatively, a location of UE 105 may be instigated within 5GCN 150 due to a request from UE 105 for an emergency call, which may be referred to as an NI-LR (as for Solution A). For an MO-LR with Solution B, UE 105 sends a location request to the serving AMF at stage 1*b* in FIG. 1C. For an NI-LR with Solution B, UE 105 sends a request or an indication of a request for an emergency call to the serving AMF at stage 1*b* in FIG. 1C. In the case of a location request sent at stage 1*b* for an MO-LR, AMF 154 may act as a relay and may forward the location request to LMF 152 at stage 2b in FIG. 1C without interpretation or modification of the location request. In the case of a request for, or an indication of, an EM call at stage 1b for an NI-LR, AMF 154 may send a notification to LMF 152 of the EM call at stage 2b. Based on the location request from UE 105 for an MO-LR that was forwarded by AMF 154 at stage 2b or a notification of an emergency call for UE 105 sent by AMF 154 at stage 2b for an NI-LR, LMF 152 may initiate a location procedure for UE 105 and may then perform stage 3 as described previously for FIG. 1C for an MT-LR. After a location estimate is obtained by LMF 152 at stage 3, and if the location was obtained for an NI-LR, the LMF 152 may send the location estimate for UE 105 to VGMLC 155 at stage 4a (e.g. as part of a signaling message), and VGMLC 155 may send the location estimate to PSAP 174 at stage 5d (e.g. via an LRF in IMS 172). For an NI-LR, the signaling messages used for stages 4a and 5d may differ from the signaling messages used for steps 4a and 5a for an MT-LR, and VGMLC 155 may send the location estimate directly to PSAP 174 at stage 5d and not via HGMLC 145. Alternatively, if the location was obtained by LMF 152 for an MO-LR, then, after a location estimate is obtained by LMF 152 at stage 3, LMF 152 may return the location estimate for UE 105 directly to UE 105 by sending a message containing the location estimate to AMF 154 at stage 4b in FIG. 1C, with AMF 154 forwarding the message without interpretation or modification to UE 105 at stage 5b. It may be observed that, for all procedures for Solution B (MT-LR, MO-LR and NI-LR), a location request or a notification of a request for an EM call which instigates a location request, is sent to LMF 152, which then obtains a location estimate and returns the location estimate to a destination entity. While AMF 154 can be involved in forwarding a request or a message from or to LMF 152, the main controlling entity for Solution B is LMF 152.

It is noted that when UE 105 is not roaming, VGMLC 155 and HGMLC 145 may be combined into one GMLC 155 as described previously for FIG. 1A, with the procedures for Solution A and Solution B described above remaining valid but without any signaling between VGMLC 155 and HGMLC 145. More details of support of location for an EM call, including for an NI-LR and MT-LR for an EM call, are provided later herein for both Solutions in association with FIGS. 6A-8B.

Figure 2:
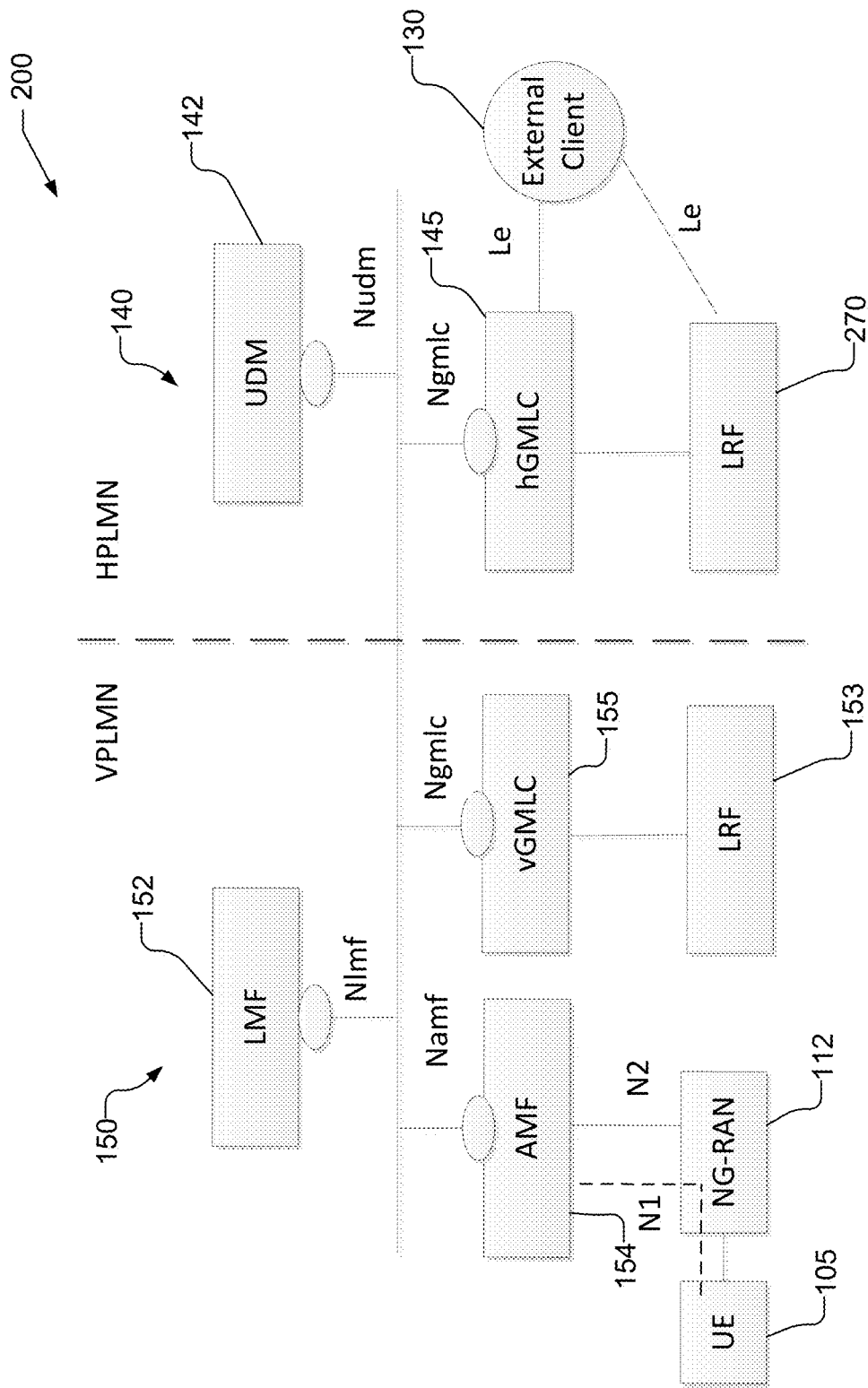
FIG. 2 shows a diagram of an architecture for location services and location related information transfer for roaming scenarios using a service based interface (SBI) representation.

FIG. 2 shows a communication system architecture 200 for location services and location information transfer for roaming scenarios using a service based interface (SBI) representation. Architecture 200 may correspond to part of communication system architecture 100 and may support Solution A, Solution B or coexistence of Solution A and Solution B. Here, N1 is a Reference point for transport of location related signaling between UE 105 and AMF 154, and N2 is a Reference point to support location related signaling between AMF 154 and NG-RAN 112. Le is a Reference point for location related signaling between HGMLC 145 or a Location Retrieval Function (LRF) 270 and external client 130, as defined in 3GPP TS 23.271. LRF 153 may be part of IMS 172 and may be connected to PSAP 174. LRFs 153 and 270 in FIG. 2 may perform the same or similar functions to VGMLC 155 and HGMLC 145, respectively, with respect to receiving and responding to a location request from an external client 130 that corresponds to a PSAP supporting an emergency call from UE 105. The following SBIs are also shown in FIG. 2: Ngmlc is an SBI exhibited by VGMLC 155 and HGMLC 145; Nlmf is an SBI exhibited by LMF 152; Namf is an SBI exhibited by AMF 154; and Nudm is an SBI exhibited by UDM 142. The SBIs shown in FIG. 2 may be as defined in 3GPP TS 23.502 and may support standard services by a particular entity indicated by the name of the SBI. For example, the Nlmf SBI may support certain services by an LMF (e.g. LMF 152) to another entity (e.g. which may include GMLC 155 and/or AMF 154), whereas the Namf SBI may support other services supported by an AMF (e.g. AMF 154) to another entity (e.g. which may include GMLC 155 and/or AMF 152).

Figure 3A:
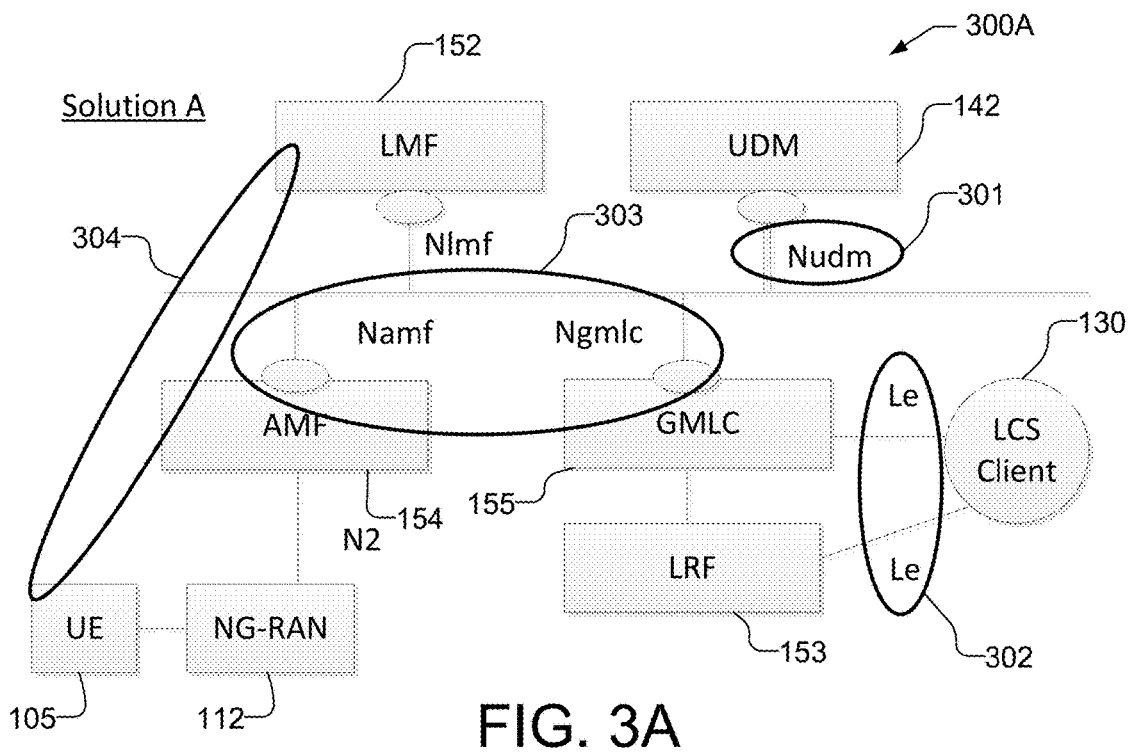
FIGS. 3A and 3B show an architecture for location services and location related information transfer for non-roaming scenarios for Solutions A and B, respectively.
Figure 3B:
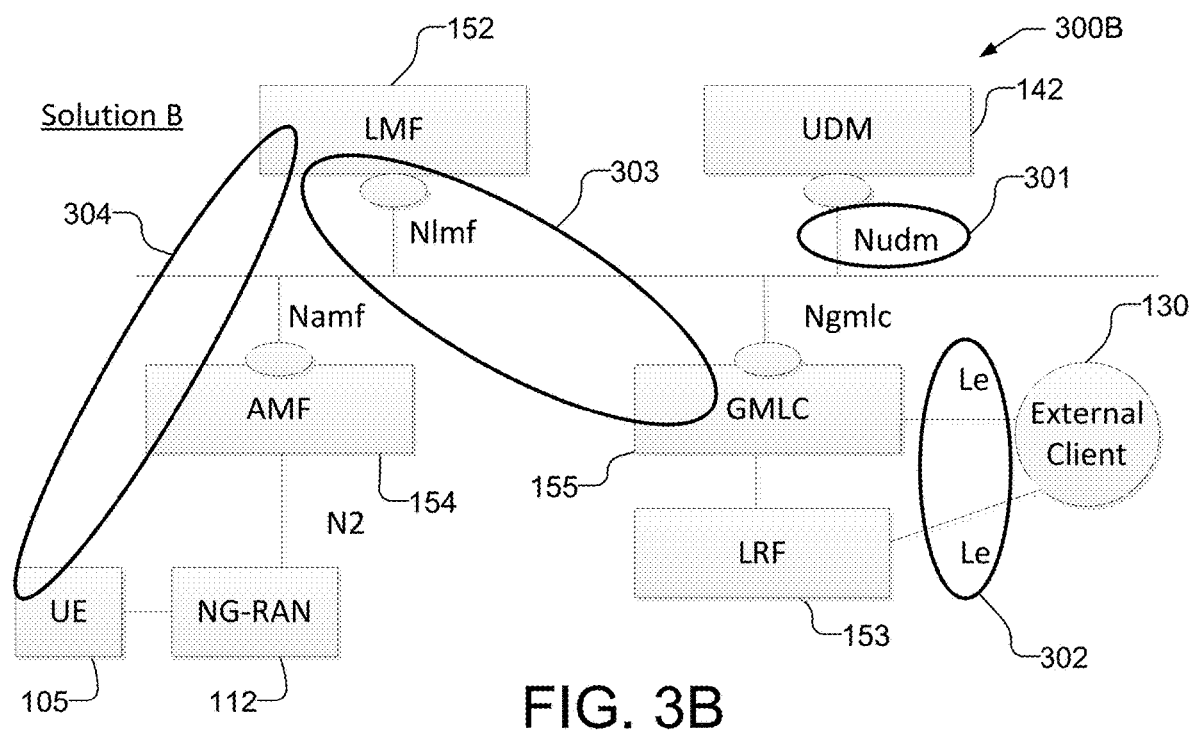

FIGS. 3A and 3B show an architecture 300A and 300B for location services and location related information transfer for non-roaming scenarios for Solutions A and B, respectively. Architectures 300A and 300B may correspond at least in part to communication system architectures 100 and 200. As illustrated by the common reference numbers in FIGS. 3A and 3B, Solution A and Solution B include common features. For example, as illustrated by 301, both Solutions may use the same GMLC-UDM SBI interface. As illustrated by 302, both Solutions may use identical LRF and GMLC external Le interfaces. Further, as illustrated by 303, both Solutions may use similar or identical SBI service operations for GMLC-AMF interaction (Solution A) or GMLC-LMF interaction (Solution B) that can be functionally similar to or identical to the Enhanced Packet Core (EPC) Location Protocol (ELP) for LTE access defined in 3GPP TS 29.172. For Solution A, the SBI indicated by 303 in FIG. 3A is the Namf SBI which is exhibited by AMF 154 and provides location services to GMLC 155. For Solution B, the SBI indicated by 303 in FIG. 3B is the Nlmf SBI which is exhibited by LMF 152 and provides location services to GMLC 155. Although the SBIs are supported by different entities (AMF 154 for Solution A and LMF 152 for Solution B), both SBIs provide location services to GMLC 155 and both may provide the same location services or almost the same location services and may then use the same or almost the same signaling protocols. As an example, the signaling messages exchanged between AMF 154 and GMLC 155 for Solution A as described for stages 1b and 5a in FIG. 1B for an MT-LR for a non-roaming UE 105 may be identical or similar to the signaling messages exchanged between LMF 152 and GMLC 155 for Solution B as described for stages 2a and 4a in FIG. 1C for an MT-LR for a non-roaming UE 105. Similarly, the signaling message sent from AMF 154 to GMLC 155 for Solution A as described for stage 5a in FIG. 1B for an NI-LR may be identical or similar to the signaling message sent from LMF 152 to GMLC 155 for Solution B as described for stage 4a in FIG. 1C for an NI-LR.

Additionally, as illustrated by 304, both Solutions may use identical or almost identical transport of LPP (or NPP) messages between a UE 105 and LMF 152, and identical or almost identical transport of NRPPa (or LPPa) messages between the NG-RAN 112 and LMF 152 through an AMF 154.

Figure 4A:
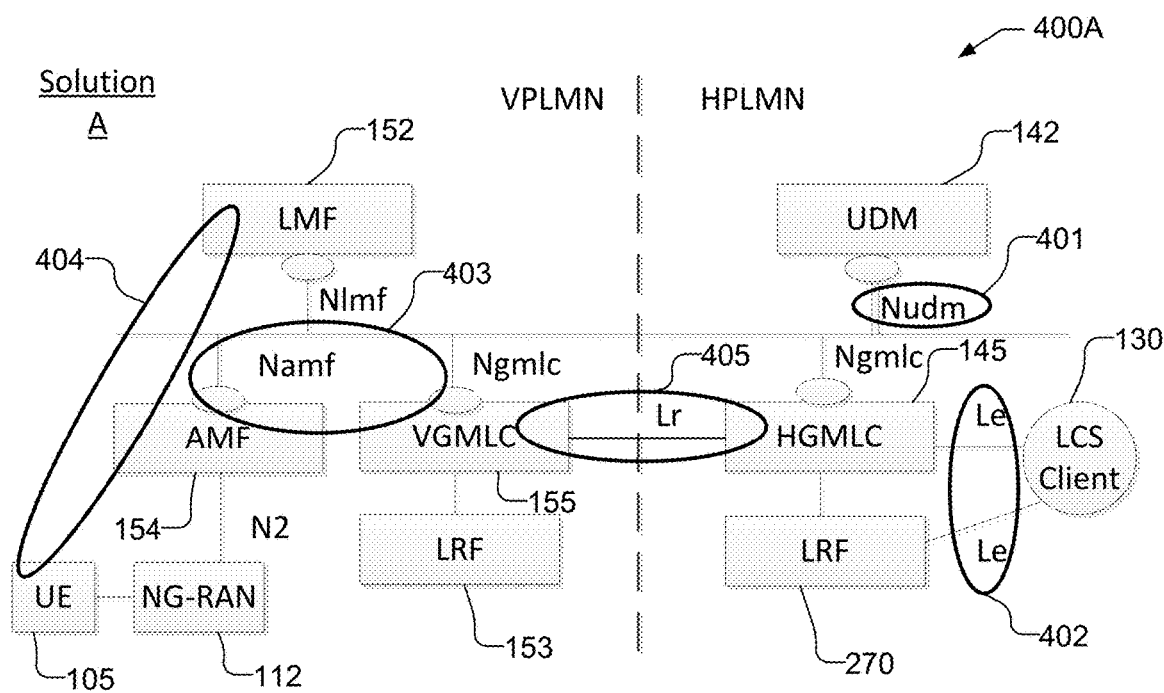
FIGS. 4A and 4B show an architecture for location services and location related information transfer for roaming scenarios for Solutions A and B, respectively.
Figure 4B:
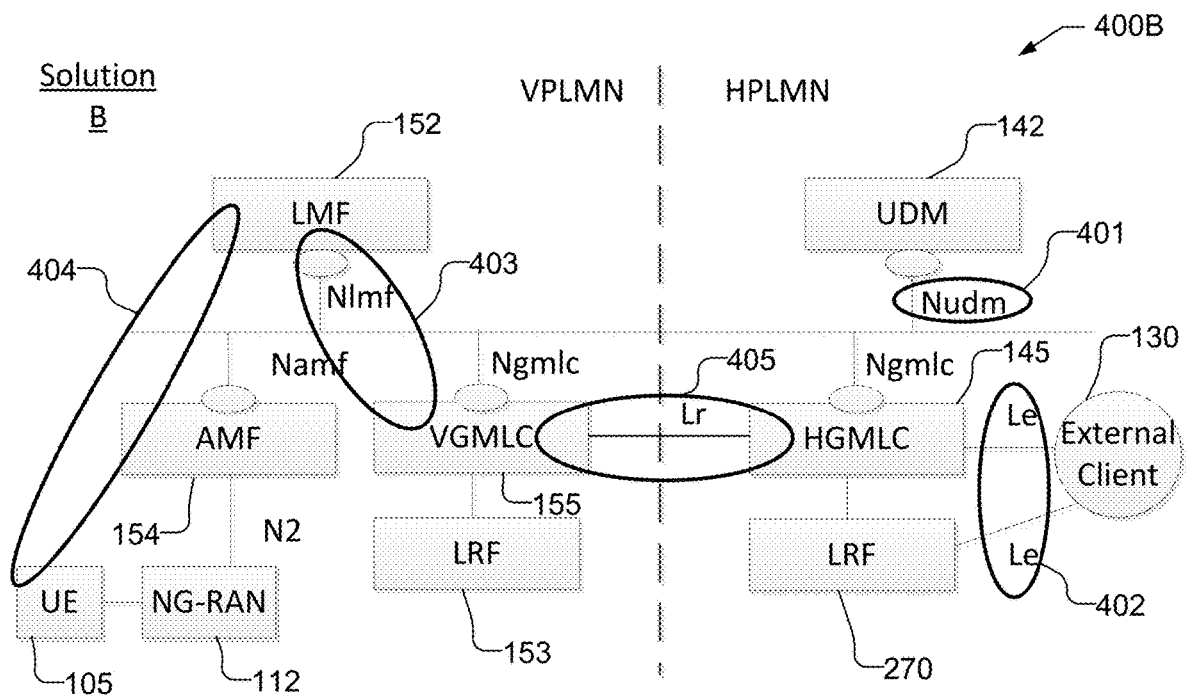

FIGS. 4A and 4B show architectures 400A and 400B for location services and location related information transfer for roaming scenarios for Solutions A and B, respectively. Architectures 400A and 400B may correspond at least in part to communication system architectures 100 and 200. Similar to FIGS. 3A and 3B, there are common features of both Solutions, which are illustrated by common reference numbers. As in the non-roaming case, as illustrated by 401, both Solutions may use same GMLC-UDM SBI. As illustrated by 402, both Solutions may use identical LRF and GMLC external interfaces, as for the non-roaming case. Further, as for the non-roaming case, as illustrated by 403, both Solutions may use identical or almost identical SBI service operations for GMLC-AMF interaction (Solution A) or GMLC-LMF interaction (Solution B) that can be functionally almost identical to ELP in 3GPP TS 29.172. As for the non-roaming cases in FIGS. 3A and 3B, for Solution A, the SBI indicated by 403 in FIG. 4A is the Namf SBI which is exhibited by AMF 154 and provides location services to VGMLC 155. For Solution B, the SBI indicated by 403 in FIG. 4B is the Nlmf SBI which is exhibited by LMF 152 and provides location services to VGMLC 155. Although the SBIs are supported by different entities (AMF 154 for Solution A and LMF 152 for Solution B), both SBIs provide location services to VGMLC 155 and both may provide the same location services or almost the same location services and may then use the same or almost the same signaling protocols. As an example, the signaling messages exchanged between AMF 154 and VGMLC 155 for Solution A as described for stages 1b and 5a in FIG. 1B for an MT-LR for a roaming UE 105 may be identical or similar to the signaling messages exchanged between LMF 152 and VGMLC 155 for Solution B as described for stages 2a and 4a in FIG. 1C for an MT-LR for a roaming UE 105. Similarly, the signaling message sent from AMF 154 to VGMLC 155 for Solution A as described for stage 5a in FIG. 1B for an NI-LR may be identical or similar to the signaling message sent from LMF 152 to VGMLC 155 for Solution B as described for stage 4a in FIG. 1C for an NI-LR.

Additionally, as for the non-roaming case, as illustrated by 404, both Solutions may use identical or almost identical transport of LPP (or NPP) messages between a UE 105 and LMF 152, and identical or almost identical transport of NRPPa (or LPPa) messages between the NG-RAN 112 and LMF 152 through an AMF 152. In addition, as illustrated by 405, both Solutions may use an identical GMLC-GMLC interface, e.g., based on the Open Mobile Alliance (OMA) Roaming Location Protocol (RLP).

Figure 5:
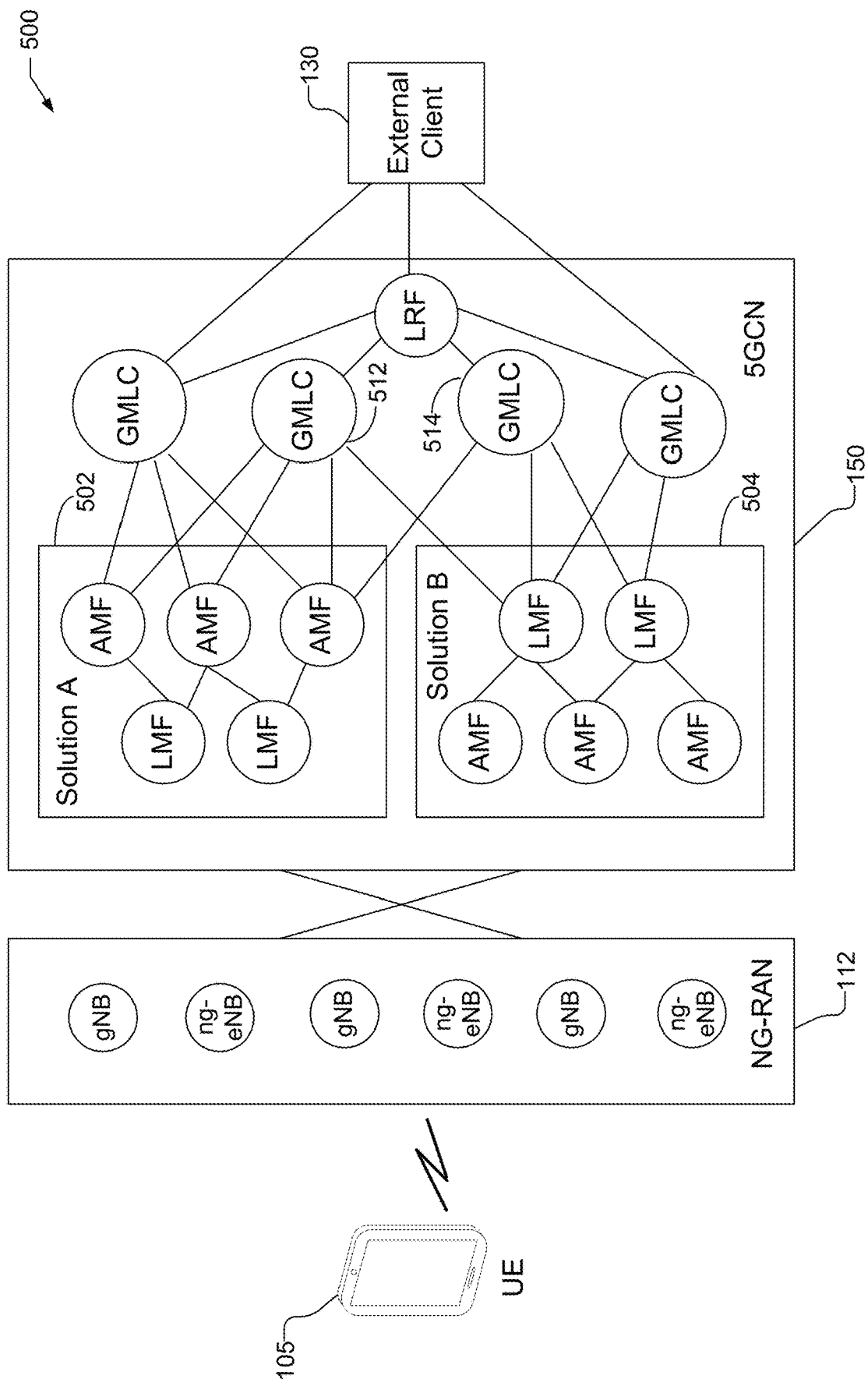
FIG. 5 shows a diagram of a communication system in which both Solution A and Solution B coexist in the same network.

FIG. 5 shows a diagram of a communication system 500 in which both Solution A and Solution B coexist in the same network. The communication system 500 may correspond to part of the communication system architectures 100 and 200. In communication system 500: each of the AMFs may correspond to or perform the same functions as AMF 154; each of the LMFs may correspond to or perform the same functions as LMF 152; each of the GMLCs may correspond to or perform the same functions as one or both of VGMLC 155 and HGMLC 145; the LRF may correspond to LRF 153; and each gNB may correspond to a gNB 110. Moreover, an AMF and an LMF in FIG. 5 may each support Solution A or Solution B, but in some embodiments, not both solutions. For example, a set 502 of AMFs and LMFs may support Solution A but not Solution B, and a possibly non-overlapping set 504 of AMFs and LMFs may support Solution B but not Solution A, as shown in FIG. 5. In some implementations, an AMF may support one solution for location of EM calls and the other solution for commercial location (e.g. and could then belong to set 502 when supporting location of an EM call and to set 504 when supporting commercial location, or vice versa). A physical LMF may also support both solutions if split into two separate logical LMFs each supporting one solution. A GMLC may connect to one or more AMFs that support solution A (e.g. any AMF in set 502) and to one or more LMFs that support solution B (e.g. any LMF in set 504), as illustrated by GMLCs 512 and 514 in FIG. 5 which support both Solutions A and B. This may be enabled due to identical or almost identical service operations, which may enable the GMLC (e.g. GMLC 512 or GMLC 514) to interact with an LMF (e.g. in set 504) in an identical or almost identical manner to interaction of the GMLC with an AMF (e.g. in set 502). Further, a gNB or ng-eNB may connect to any AMF for Solution A (e.g. any AMF in set 502) and to any AMF for Solution B (e.g. any AMF in set 504) due to identical N1 and N2 interface support.

Figure 8A:
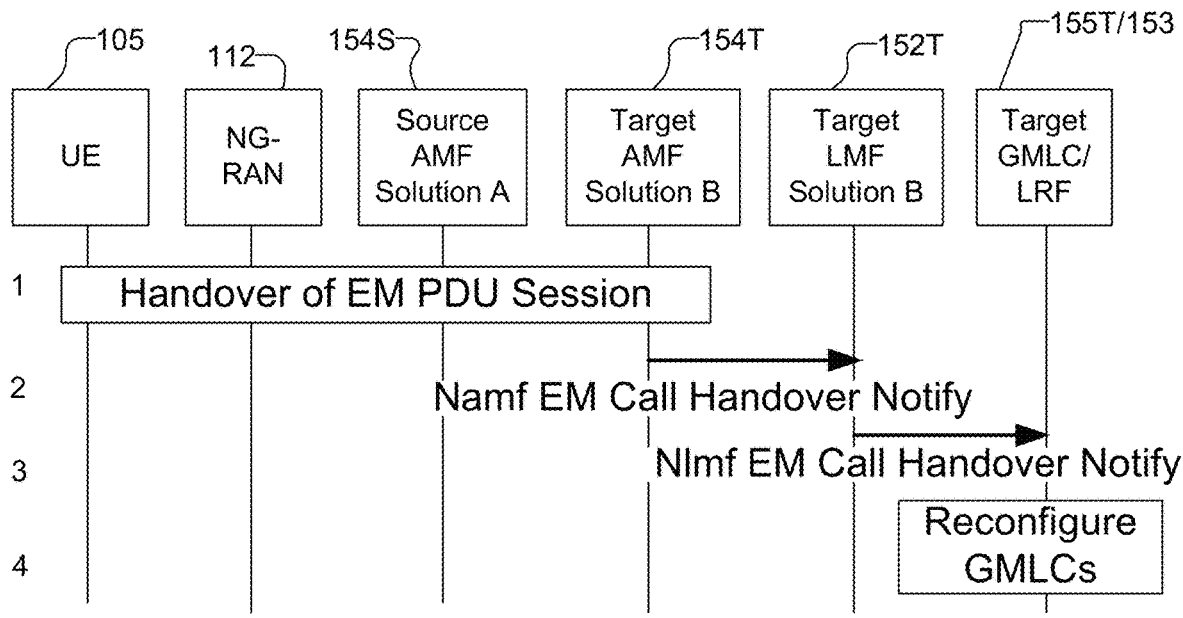
FIGS. 8A and 8B summarize an EM call handover from Solution A to Solution B (FIG. 8A) and from Solution B to Solution A (FIG. 8B) in the same network.
Figure 8B:
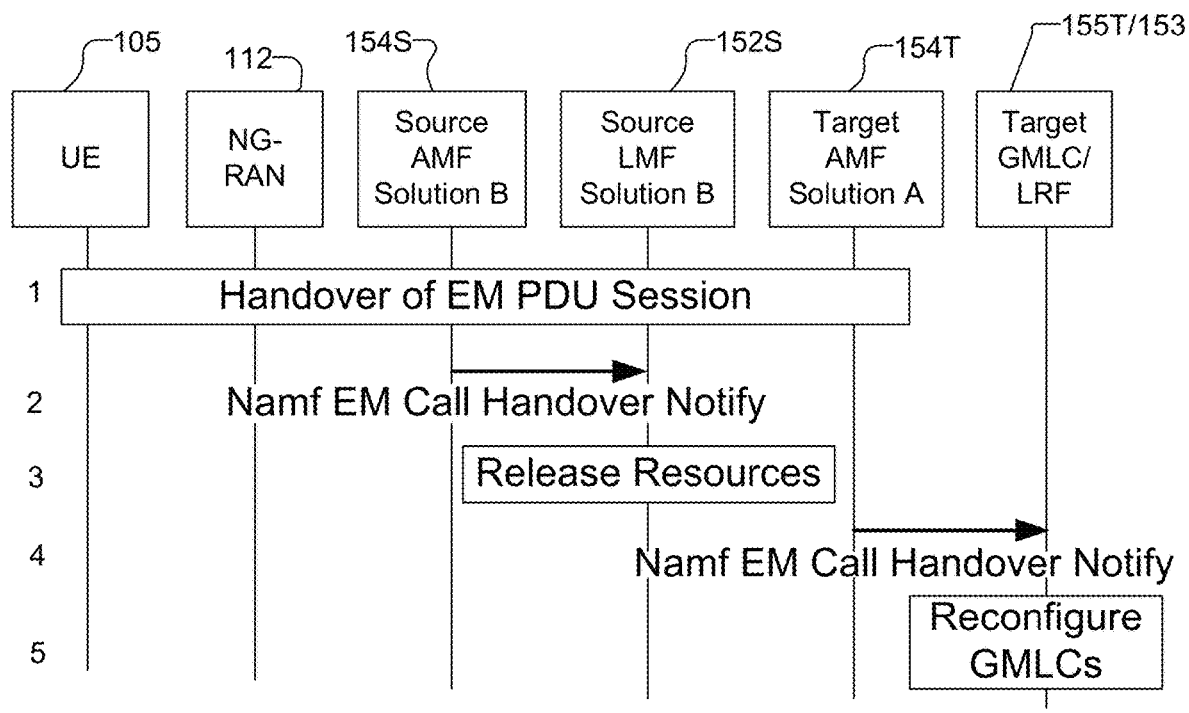

Migration from one location solution to another within the same network (e.g. within communication system architecture 500 or within communication system architecture 100 and/or 200) may be possible. For example, a network operator may start with either Solution A or Solution B across all or part of their 5GCN (e.g. 5GCN 150). The operator may then migrate their 5GCN towards the other solution one AMF (or multiple AMFs) at a time, which could mean transferring the AMF (or AMFs) from the set 502 to the set 504 or from the set 504 to the set 502 in FIG. 5, depending on the direction of migration. During the transition, location for EM calls and commercial applications may continue to work correctly and an EM call starting on an AMF supporting one solution may handoff to an AMF supporting the other solution with continuity of location, as illustrated in FIGS. 8A and 8B discussed below. A GMLC may treat both solutions similarly or identically for location of EM calls in terms of performing similar or identical interaction with an AMF for Solution A or with an LMF for Solution B, due to similar or identical signaling support as described previously in association with FIGS. 3A-4B. A GMLC may treat both solutions nearly identically for commercial location, again due to similar or identical signaling support as described previously in association with FIGS. 3A-4B, though may need to select an LMF for Solution B (versus having an LMF selected by an AMF for solution A). An operator may restrict an AMF to either Solution A or Solution B during a transition, but an AMF could support one solution for EM calls and the other solution for commercial location, as already mentioned. Separate logical parts of the same physical LMF could also support both solutions. This may enable several different types of migration from one solution to the other.

For each of the procedures described previously with respect to FIGS. 1B and 1C and described below with respect to FIGS. 6A-8B, it may be necessary to ensure that an LMF 152 selected, determined or assigned by an AMF 154 or GMLC 155 and an GMLC 155 selected, assigned or determined by an LMF 152 or AMF 154 supports the same solution (i.e. Solution A or Solution B) as the entity performing the selection, assignment or determination. This may be accomplished if the entity performing the selection, assignment or determination is configured with the solution (s) supported by each entity which may be selected, assigned or determined or is configured only with the identities of entities which support the same solution(s) as the entity performing the selection, assignment or determination. For example, AMFs in set 502 may be configured only with the identities of LMFs in set 502 and not with the identities of LMFs in set 504. Similarly, AMFs in set 502 which support Solution A and LMFs in set 504 which support Solution B may both be configured with the identities or addresses of GMLCs 512 and 514 (which support both solutions A and B) bit not with the addresses or identities of GMLCs which do not support the same solution.

Figure 6A:
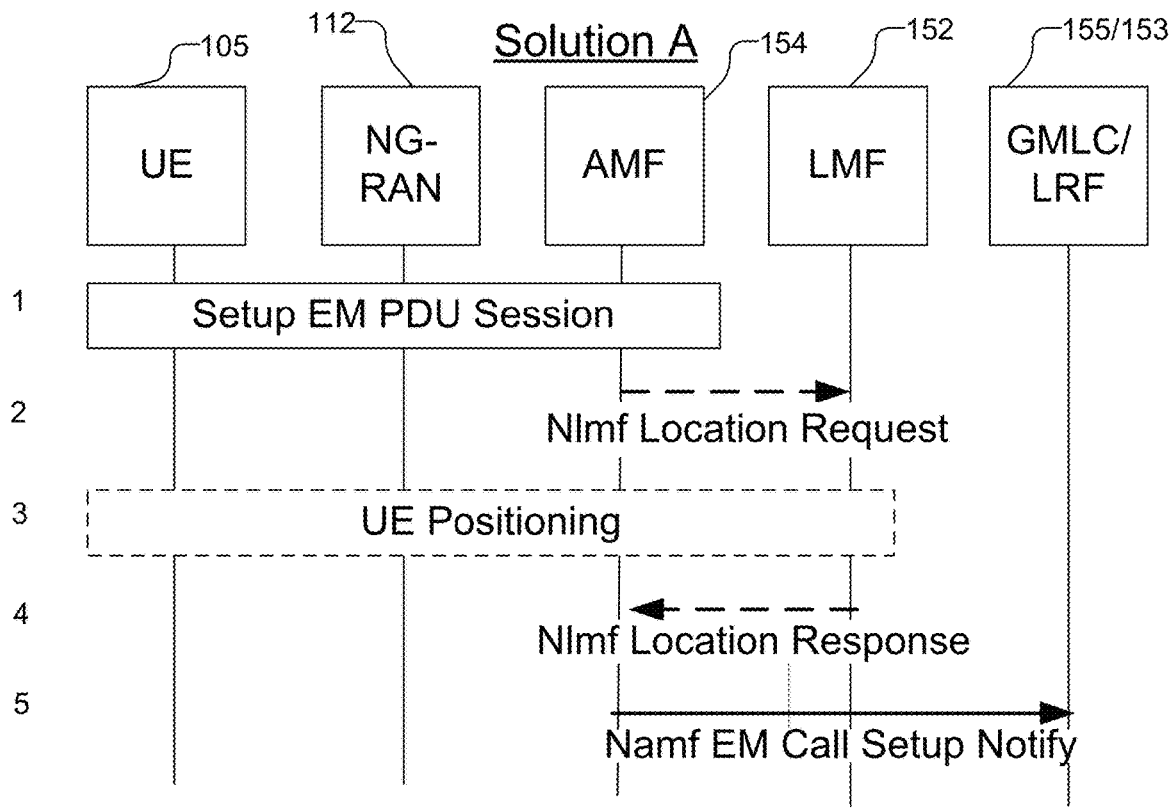
FIGS. 6A and 6B summarize a Network Induced Location Request (NI-LR) for an emergency (EM) call using Solution A and Solution B, respectively, in the same network.
Figure 6B:
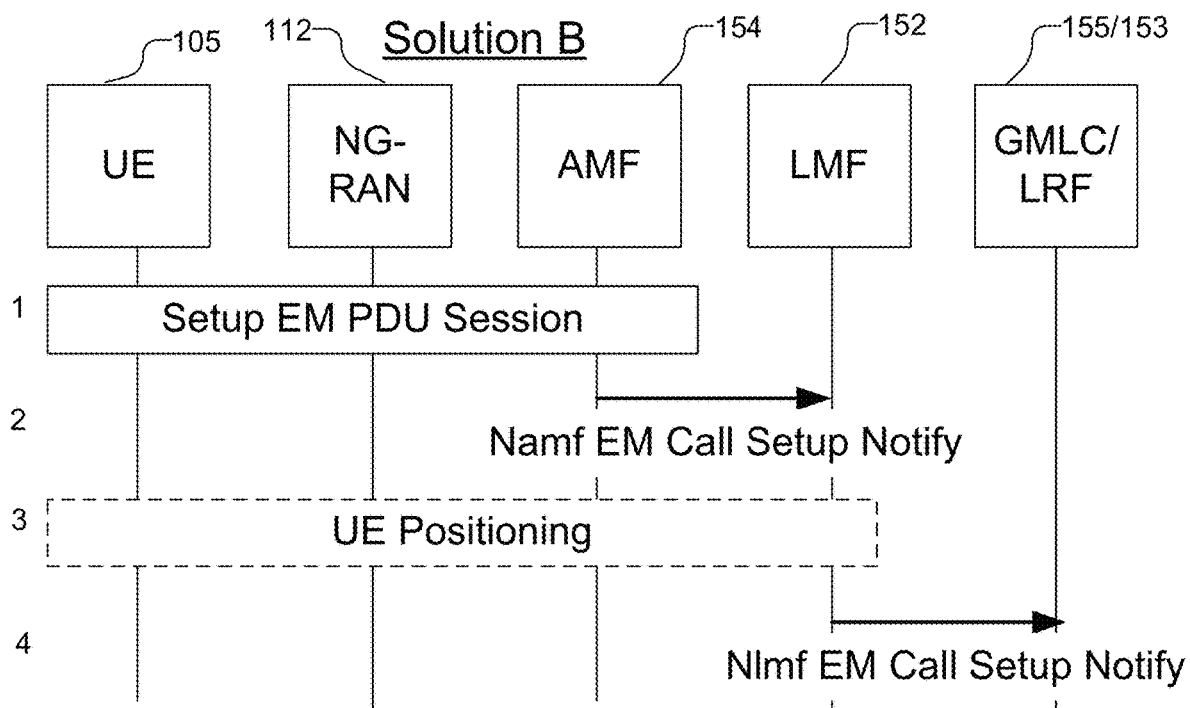

FIGS. 6A and 6B summarize emergency call (EM) Network Induced Location Request (NI-LR) support by Solution A and Solution B, respectively, in the same network (e.g. within communication system 500 or within communication system 100 and/or 200). FIGS. 6A and 6B provide additional details for an NI-LR beyond those described previously at a high level in association with FIGS. 1B and 1C. As can be seen in FIG. 6A, Solution A includes the following procedure:

At stage 1 in FIG. 6A, the UE 105, NG-RAN 112, and an AMF 154 which supports Solution A set up an emergency Protocol Data Unit (PDU) session for UE 105, e.g. after a user of UE 105 dials an emergency number such as "911" or "112".

At stage 2, the AMF 154 selects an LMF 152 that supports Solution A and sends a location request for UE 105 to the LMF 152 using an LMF service operation.

At stage 3, positioning of UE 105 is performed (e.g. using LPP and/or NRPPa signaling as described previously for FIG. 1A) in which a location estimate is determined by the LMF 152 for the UE 105.

At stage 4, the LMF 152 returns a Location Response, which may include the determined location estimate for the UE 105, to the AMF 154. Stages 2-4 are optional and may not always be performed.

At stage 5, the AMF 154 determines a GMLC 155 (e.g. which can support Solution A or Solutions A and B) and transmits a message (e.g. an EM Call Setup Notify message) using an AMF service operation to the GMLC 155 and an associated LRF 153. The message may include the location estimate obtained at stage 4 (if stage 4 occurs), an indication of an EM call for UE 105 and the identity of AMF 154.

As can be seen in FIG. 6B, Solution B includes the following procedure:

At stage 1 in FIG. 6B, the UE 105, NG-RAN 112, and an AMF 154 that supports Solution B set up an emergency Protocol Data Unit (PDU) session for UE 105, e.g. after a user of UE 105 dials an emergency number such as "911" or "112".

At stage 2, the AMF 154 selects or otherwise determines and assigns an LMF 152 which supports Solution B and transmits a message (e.g. an EM Call Setup Notify message) using an AMF service operation to the LMF 152. The message may indicate an EM call request for IE 105.

At stage 3, positioning of UE 105 is optionally performed in which a location estimate is determined by the LMF 152 for the UE 105 (e.g. using LPP and/or NRPPa signaling as described previously for FIG. 1A).

At stage 4, the LMF 152 determines a GMLC 155 (e.g. which can support Solution B or Solutions B and A) and transmits a message (e.g. EM Call Setup Notify message) using an LMF service operation to the GMLC 155 and an associated LRF 153. The message may include the location estimate obtained at stage 3 (if a location estimate is obtained at stage 3), an indication of an EM call for UE 105 and the identity of LMF 152.

Thus, as can be seen in FIGS. 6A and 6B, Solution A can use an LMF Location Request service operation (at stage 2 in FIG. 6A) which is absent for Solution B. Solution B can use an AMF EM Call Setup Notify service operation (at stage 2 in FIG. 6B) which is absent for Solution A. Both solutions may use identical UE positioning (at stage 3 in FIG. 6A and stage 3 in FIG. 6B). Additionally, both solutions may use an identical or almost identical EM Call Setup Notify service operation towards the GMLC 155 sent by an AMF 154 for Solution A (at stage 5 in FIG. 6A) and sent by an LMF 152 for Solution B (at stage 4 in FIG. 6B).

Figure 7A:
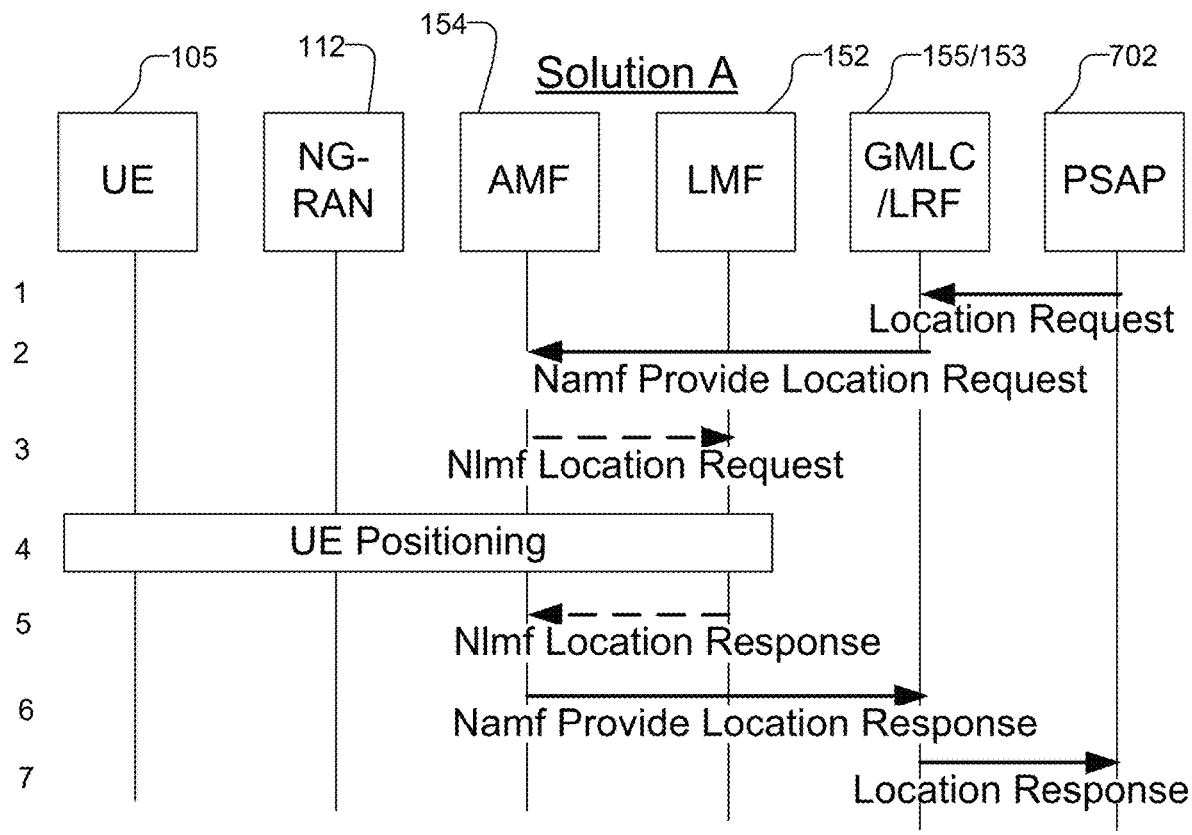
FIGS. 7A and 7B summarize a Mobile Terminated Location Request (MT-LR) for an EM call using Solution A and Solution B, respectively, in the same network.
Figure 7B:
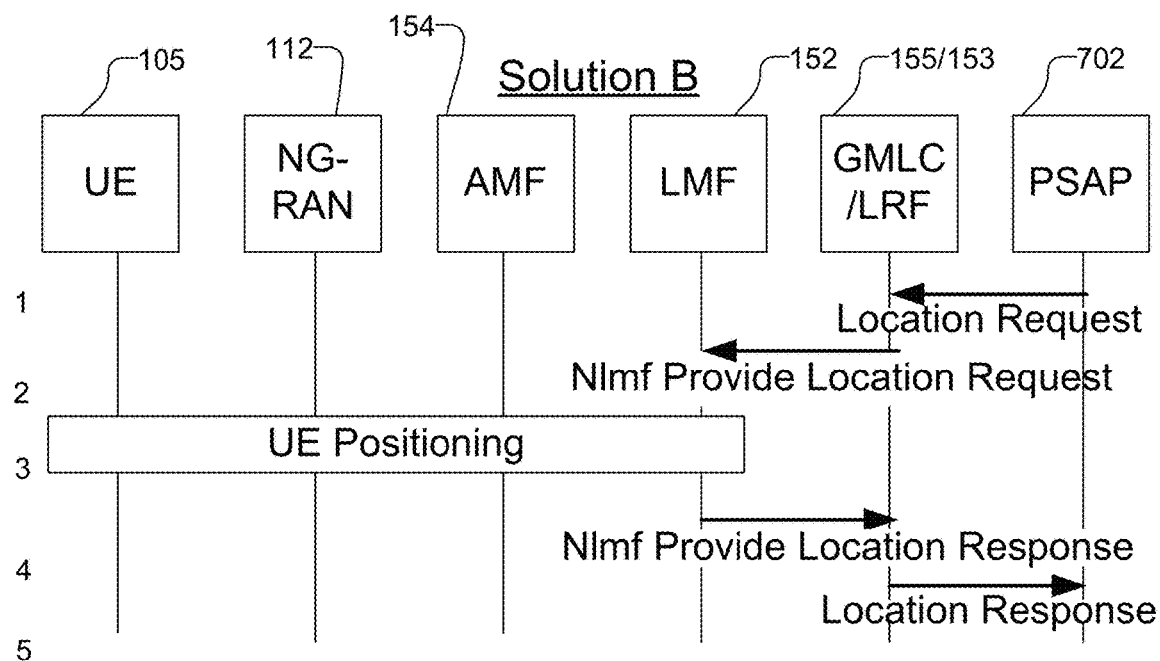

FIGS. 7A and 7B summarize emergency call (EM) Mobile Terminated Location Request (MT-LR) support by Solution A and Solution B, respectively, in the same network (e.g. within communication system 500 or within communication system 100 and/or 200). As can be seen in FIG. 7A, Solution A includes the following procedure.

At stage 1 in FIG. 7A, a Public Safety Answering Point (PSAP) 702 (e.g. which may correspond to PSAP 174) sends a location request to a GMLC/LRF 155/153 to request the location of a UE 105 that has established an EM call to the PSAP 702 (e.g. via IMS 172).

At stage 2, the GMLC/LRF 155/153 sends a Provide Location Request (e.g. using an AMF service operation) to the AMF 154 (where AMF 154 supports Solution A) to request the location of UE 105. GMLC/LRF 155/153 may have been previously notified of the identity of AMF 154 due to the occurrence of the NI-LR procedure shown in FIG. 6A.

At stage 3, the AMF 154 selects an LMF 152 that supports Solution A and sends a Location Request (e.g. using an LMF service operation) to the LMF 152 to request the location of UE 105.

At stage 4, UE positioning is performed (e.g. using LPP and/or NRPPa signaling as described previously for FIG. 1A) in which a location estimate is determined by the LMF 152 for the UE 105.

At stage 5, the LMF 152 returns a Location Response, which may include the determined location estimate for the UE 105, to the AMF 154.

At stage 6, the AMF 154 returns a Provide Location Response to the GMLC/LRF 155/153, which may include the determined location estimate for the UE 105.

At stage 7, the GMLC/LRF 155/153 returns a Location Response to the PSAP 702, which may include the determined location estimate for the UE 105.

As can be seen in FIG. 7B, Solution B includes the following procedure:

At stage 1 in FIG. 7B, a Public Safety Answering Point (PSAP) 702 (e.g. which may correspond to PSAP 174) sends a location request to a GMLC/LRF 155/153 to request the location of a UE 105 that has established an EM call to the PSAP 702 (e.g. via IMS 172).

At stage 2, the GMLC/LRF 155/153 sends a Provide Location Request (e.g. using an LMF service operation) to the LMF 152 which supports Solution B to request the location of UE 105. GMLC/LRF 155/153 may have been previously notified of the identity of LMF 152 due to the occurrence of the NI-LR procedure shown in FIG. 6B.

At stage 3, UE positioning is performed (e.g. using LPP and/or NRPPa signaling as described previously for FIG. 1A) in which a location estimate is determined by the LMF 152 for the UE 105.

At stage 4, the LMF 152 returns a Provide Location Response, which may include the determined location estimate for the UE 105, to the GMLC/LRF 155/153.

At stage 5, the GMLC/LRF 155/153 returns a Location Response to the PSAP 702, which may include the determined location estimate for the UE 105.

Thus, as can be seen in FIGS. 7A and 7B, Solution A may use an LMF Location Request service operation from the AMF 154 (at stage 3 in FIG. 7A) that is absent in Solution B. Both Solutions A and B may use identical UE positioning (at stage 4 in FIG. 7A and stage 3 in FIG. 7B). Moreover, both Solutions A and B may use an identical or almost identical Provide Location Request service operation sent from the GMLC 155 to an AMF 154 for Solution A (at stage 2 in FIG. 7A) and sent from the GMLC 155 to an LMF 152 for Solution B (at stage 2 in FIG. 7B). Similarly, both Solutions A and B may use an identical or almost identical Provide Location Response service operation sent from the AMF 154 to GMLC 155 for Solution A (at stage 6 in FIG. 7A) and sent from the LMF 152 to GMLC 155 for Solution B (at stage 4 in FIG. 7B).

FIGS. 8A and 8B summarize emergency (EM) call handover from Solution A to Solution B (FIG. 8A) and from Solution B to Solution A (FIG. 8B) in the same network (e.g. within communication system 500 or within communication system 100 and/or 200). FIG. 8A shows the handover of an EM PDU session for UE 105 from a source AMF 154S that supports Solution A to a target AMF 154T that supports Solution B and includes the following procedure.

Prior to stage 1 in FIG. 8A (and not shown in FIG. 8A, but possibly making use of the procedure shown in FIG. 6A), the UE 105 establishes an EM PDU session with a 5GCN 150 and an EM call to a PSAP (e.g. PSAP 702 or PSAP 174) via an NG-RAN 112 and the 5GCN 150 (e.g. IMS 172). The serving AMF 154S for UE 105 (which may be the initial serving AMF or a subsequent AMF following one or more handovers of the EM call) is assumed to support Solution A. Sometime later, at stage 1 in FIG. 8A, the EM PDU session for the emergency call for UE 105 undergoes handover from the source AMF 154S supporting Solution A to the target AMF 154T supporting Solution B. The handover, may involve interactions between the UE 105, source AMF 154S, target AMF 154T and NG-RAN 112 (e.g. as described in 3GPP TS 23.502). For example, as part of stage 1, the NG-RAN 112 (e.g. a serving gNB 110 for UE 105) may determine a need for the handover and may provide an indication of the handover to source AMF 154S, which may then send an indication of the handover to the target AMF 154T and perform the handover to the target AMF 154T.

At stage 2 in FIG. 8A, the target AMF 154T for Solution B selects (e.g. determines and assigns) a target LMF 152T which supports Solution B and transmits an EM Call Handover Notify message (e.g. using an AMF service operation) to the target LMF 152T. The EM Call Handover Notify message may include an identification of UE 105 and indicate an EM call handover for UE 105.

At stage 3, the target LMF 152T for Solution B selects a target GMLC 155T that supports Solution B and possibly Solution A and transmits an EM Call Handover Notify message (e.g. using an LMF service operation) to the target GMLC 155T. The EM Call Handover Notify message may include an identification of UE 105 and indicate an EM call handover for UE 105.

At stage 4, the target GMLC 155T and an LRF 153 for the EM call may reconfigure the GMLCs (e.g. replace a source GMLC not shown in FIG. 8A with the target GMLC 155T to enable further location requests for UE 105 from the PSAP to which the EM call for UE 105 was sent previously). The reconfiguration of the GMLCs may enable location support for UE 105 to continue using Solution B.

FIG. 8B shows the handover of an EM PDU session for UE 105 from a source AMF 154S that supports Solution B to a target AMF 154T that supports Solution A and includes the following procedure.

Prior to stage 1 in FIG. 8B (and not shown in FIG. 8B, but possibly making use of the procedure shown in FIG. 6B), the UE 105 establishes an EM PDU session with a 5GCN 150 and an EM call to a PSAP (e.g. PSAP 702 or PSAP 174) via an NG-RAN 112 and the 5GCN 150 (e.g. IMS 172). The serving AMF 154S for UE 105 (which may be the initial serving AMF or a subsequent AMF following one or more handovers of the EM call) is assumed to support Solution B. Additionally, the EM call for UE 105 is assumed to have a source LMF 152S, which may be determined and assigned according to the procedure in FIG. 6B (e.g. during or following the establishment of the EM call) or the procedure in FIG. 8A (e.g. following handover of the EM call from an AMF supporting Solution A to the AMF 154S supporting Solution B). Sometime later, at stage 1 in FIG. 8B, the EM PDU session for the emergency call undergoes handover from the source AMF 154S supporting Solution B to the target AMF 154T supporting Solution A. The handover, may involve interactions between the UE 105, source AMF 154S, target AMF 154T and NG-RAN 112 (as described in 3GPP TS 23.502). For example, as part of stage 1, the NG-RAN 112 (e.g. a serving gNB 110 for UE 105) may determine a need for the handover and may provide an indication of the handover to source AMF 154S, which may then send an indication of the handover to the target AMF 154T and perform the handover to the target AMF 154T.

At stage 2 in FIG. 8B, the source AMF 154S for Solution B transmits an EM Call Handover Notify message (e.g. using an AMF service operation) to the source LMF 152S for Solution B. The EM Call Handover Notify message may include an identification of UE 105 and indicate an EM call handover for UE 105.

At stage 3, the source LMF 152S for Solution B releases resources for the EM call.

At stage 4, the target AMF 154T for Solution A selects a target GMLC 155T that supports Solution A and possibly Solution B and transmits an EM Call Handover Notify message (e.g. using an AMF service operation) to the target GMLC 155T. The EM Call Handover Notify message may include an identification of UE 105 and indicate an EM call handover for UE 105.

At stage 5, the target GMLC 155T and an LRF 153 for the EM call may reconfigure the GMLCs (e.g. replace a source GMLC not shown in FIG. 8B with the target GMLC 155T to support further location requests for UE 105 from the PSAP to which the EM call for UE 105 was sent previously). The reconfiguration of the GMLCs may enable location support for UE 105 to continue using Solution A.

Accordingly, as can be seen in FIGS. 8A and 8B, Solution B uses an AMF EM Call Handover Notify service operation that is sent from an AMF 154 to an LMF 152 that both support Solution B (e.g. as at stage 2 in FIG. 8A and at stage 2 in FIG. 8B) that may be absent for Solution A. Both Solutions A and B may use an identical or an almost identical EM Call Handover Notify service operation that is sent by an AMF 154 supporting Solution A to a GMLC 155 (e.g. as at stage 4 in FIG. 8B) and is sent by an LMF 152 supporting Solution B to a GMLC 155 (e.g. as at stage 3 in FIG. 8A). The notification of handover sent to the GMLC 155 can be the same (or a similar notification) of handover that is sent by an AMF 154 (for Solution A) or LMF 152 (for Solution B) to a GLMC 155 to notify the GMLC 155 of other types of handover (e.g. handover of an EM call to or from another RAN).

Thus, as illustrated in the previous figures, while Solutions A and B have different properties, they may have sufficient in common to enable coexistence in the same network, migration from one solution to the other and a high degree of signaling overlap. This may enable both solutions to be defined and used for support of EM calls and/or support of commercial location. The consequences if both solutions are defined (e.g. by 3GPP) may include defining a common SBI based architecture (e.g. in 3GPP TS 23.501), defining two sets of procedures for NI-LR, MT-LR, MO-LR and Handover for EM Calls (e.g. in 3GPP TS 23.502), and defining a common set of procedures for UE Positioning and NG-RAN location support (e.g. in 3GPP TS 23.502). The consequences for signaling if both solutions are defined may include defining common service operation protocols to be consumed by a GMLC 155 and provided by an AMF 154 for Solution A or by an LMF 152 or Solution B, defining an additional LMF service operation protocol to support a location request from an AMF 154 to an LMF 152 for Solution A, and/or defining or enhancing AMF service operation protocol(s) to support EM PDU session notification from an AMF 154 to an LMF 152 for Solution B.

Figure 9:
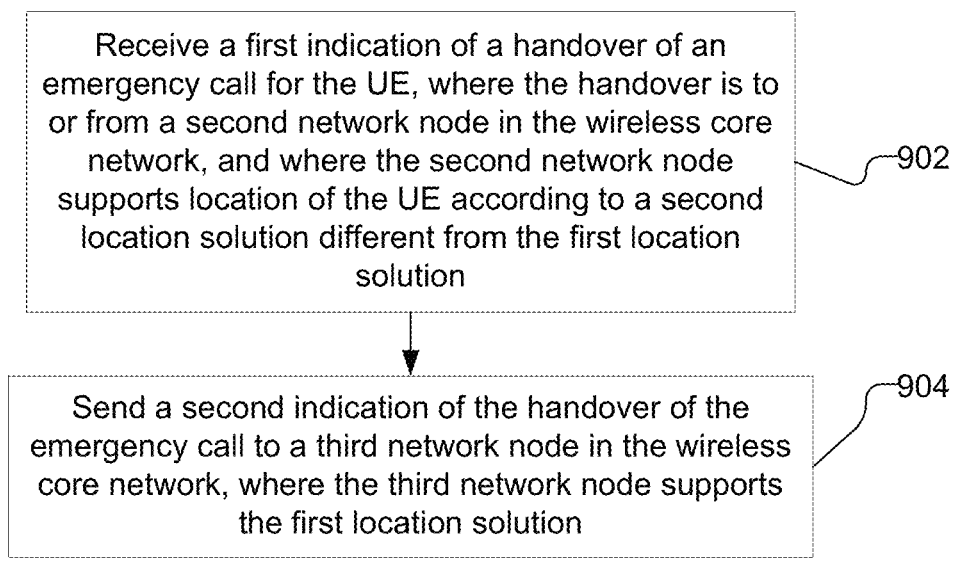
FIG. 9 is a process flow illustrating a method performed at a first network node in a wireless core network for supporting location of a UE according to one embodiment.

FIG. 9 is a process flow illustrating a method performed at a first network node in a wireless core network for supporting location of a UE (e.g. UE 105) according to a first location solution such as Solution A or Solution B. As illustrated, at block 902, a first indication of a handover of an emergency call for the UE is received, where the handover is to or from a second network node in the wireless core network, and where the second network node supports location of the UE according to a second location solution different from the first location solution. For example, the first location solution may be Solution A and the second location solution may be Solution B. Alternatively, the first location solution may be Solution B and the second location solution may be Solution A. For example, block 902 may correspond to stage 1 in FIG. 8A, stage 2 in FIG. 8A or stage 1 in FIG. 8B.

At block 904, a second indication of the handover of the emergency call is sent to a third network node in the wireless core network, where the third network node supports the first location solution. For example, block 904 may correspond to stage 2 in FIG. 8A, stage 3 in FIG. 8A, stage 2 in FIG. 8B or stage 4 in FIG. 8B.

The wireless core network may be a Fifth Generation Core Network (5GCN) such as VPLMN 5GCN 150. The first network node may be an Access and Mobility Management Function (AMF) such as AMF 154 or a Location Management Function (LMF) such as LMF 152. Moreover, the second network node may be an AMF such as another AMF (or the AMF 154) in VPLMN 5GCN 150. In one implementation, the second indication of the handover of the emergency call supports the first location solution and the second location solution (e.g. may be the same indication of handover regardless of whether the first location solution is Solution A or Solution B).

The third network node may be a gateway mobile location center (GMLC) such as VGMLC 155 or an LMF such as LMF 152.

In one embodiment, the first network node is an AMF (e.g. AMF 154), the third network node is an LMF (e.g. LMF 152) and the handover is to the second network node. In this embodiment, the method may further include receiving the first indication of the handover from a Next Generation Radio Access Network (NG-RAN) such as NG-RAN 112; and performing the handover of the emergency call to the second network node (e.g. as at stage 1 in FIG. 8B).

In another embodiment, the first network node is an AMF (e.g. AMF 154) and the handover is from the second network node. In this embodiment, the method may further include receiving the first indication of the handover from the second network node (e.g. as at stage 1 in FIG. 8A or stage 1 in FIG. 8B).

In another embodiment, the first network node is an LMF (e.g. LMF 152), the third network node is a GMLC (e.g. GMLC 155 or VGMLC 155), and the handover is from the second network node. In this embodiment, the method may further include receiving the first indication of handover from a fourth network node (e.g. as at stage 2 in FIG. 8A), where the fourth network node is an AMF (e.g. a target AMF 154T in VPLMN 5GCN 150), where the handover is performed from the second network node to the fourth network node.

Figure 10:
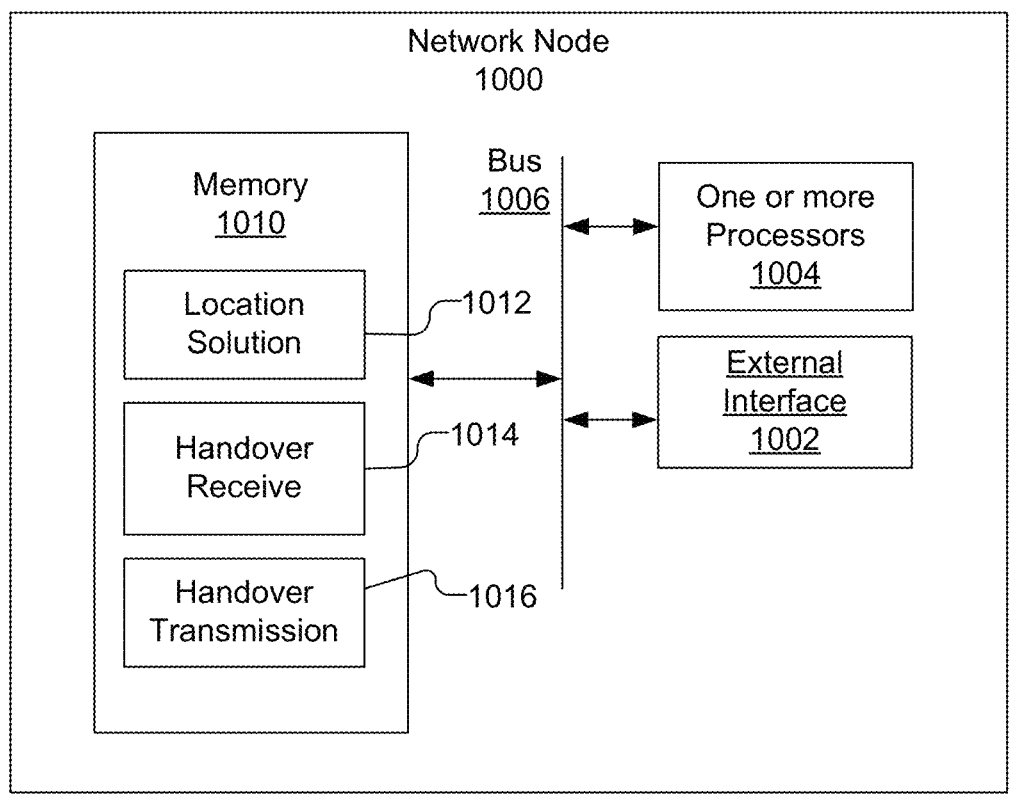
FIG. 10 is a diagram illustrating an example of a hardware implementation of a network node in a wireless core network for supporting location of a UE.

FIG. 10 is a diagram illustrating an example of a hardware implementation of a network node 1000 (also referred to as a first network node 1000) in a wireless core network for supporting location of a UE according to a location solution (also referred to as a first location solution) such as Solution A or Solution B. The network node may correspond to any of the first network node, second network nude, third network node or fourth network node for the process flow of FIG. 9. The network node may be, e.g., an Access and Mobility Management Function (AMF) 154, a Location Management Function (LMF) 152, or a GMLC (e.g. VGMLC 155 or HGMLC 145). The network node 1000 includes, e.g., hardware components such as an external interface 1002, which may be a wired or wireless interface and capable (depending on the type of network node 1000) of connecting to a GMLC (e.g. GMLC 155), an AMF (e.g., an AMF 154), an LMF (e.g. LMF 152) and/or an NG-RAN (e.g. NG-RAN 112).

The network node 1000 includes one or more processors 1004 and memory 1010, which may be coupled together with bus 1006. The memory 1010 may contain executable code or software instructions that when executed by the one or more processors 1004 cause the one or more processors to operate as a special purpose computer programmed to perform the methods and procedures disclosed herein.

As illustrated in FIG. 10, the memory 1010 includes one or more components or modules that when implemented by the one or more processors 1004 implements the methodologies as described herein. While the components or modules are illustrated as software in memory 1010 that is executable by the one or more processors 1004, it should be understood that the components or modules may be dedicated hardware or firmware either in the processor or off processor. As illustrated, the memory 1010 may include a location solution unit 1012 that supports determination of the location of a UE according to a first location solution (e.g. Solution A or Solution B). The memory 1010 may further include a handover receive unit 1014 that enables the one or more processors 1004 to receive via the external interface 1002 and process an indication of a handover an emergency call for the UE from or to a second network node in the wireless core network, where the second network node supports the determination of the location of the UE according to a second location solution that is different than the first location solution. The memory 1010 may further include a handover transmit unit 1016 that causes the one or more processors 1004 to transmit via the external interface 1002 an indication of handover of the emergency call to a third network node in the wireless core network, such as a gateway mobile location center (GMLC) LMF, where the third network node supports the first location solution. By way of example, the network node 1000 may be an AMF, where the indication of the handover may be received from a Next Generation Radio Access Network (NG-RAN), and the handover transmission unit 1016 further performs the handover of the emergency call to the second network node. The indication of the handover may be received from the second network node itself. In another implementation, the network node 1000 may be an LMF, where the indication of the handover is received from an AMF, and the handover is performed from the second network node to the AMF.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 1010, and are configured to cause the one or more processors to operate as a special purpose computer programmed to perform the algorithms disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a first network entity 1000, such as LMF 152 or AMF 154 shown in FIG. 1A, which supports location of a UE according to a first location solution may include a means for receiving a first indication of a handover of an emergency call for the UE, wherein the handover is to or from a second network node in the wireless core network, wherein the second network node supports location of the UE according to a second location solution different to the first location solution, which may be, e.g., the external interface 1002 and one or more processors 1004 with dedicated hardware or implementing executable code or software instructions in memory 1010 such as the handover receive unit 1014. A means for sending a second indication of the handover of the emergency call to a third network node in the wireless core network, wherein the third network node supports the first location solution, may be, e.g., the external interface 1002 and one or more processors 1004 with dedicated hardware or implementing executable code or software instructions in memory 1010 such as the handover transmission unit 1016. Additionally, a means for performing a handover of the emergency call to the second network node may be, e.g., the external interface 1002 and one or more processors 1004 with dedicated hardware or implementing executable code or software instructions in memory 1010 such as the handover transmission unit 1016.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method at a first network node in a wireless core network for supporting location of a user equipment (UE) according to a first location solution comprising:
   receiving a first indication of a handover of an emergency call for the UE, wherein the handover is to or from a second network node in the wireless core network, wherein the second network node supports location of the UE according to a second location solution different from the first location solution; and
   sending a second indication of the handover of the emergency call to a third network node in the wireless core network, wherein the third network node supports the first location solution, wherein the second indication of the handover of the emergency call supports the first location solution and the second location solution.

2. The method of claim 1, wherein the wireless core network is a Fifth Generation Core Network (5GCN).

3. The method of claim 2, wherein the first network node is an Access and Mobility Management Function (AMF) or a Location Management Function (LMF).

4. The method of claim 3, wherein the second network node is an AMF.

5. The method of claim 4, wherein the third network node is a gateway mobile location center (GMLC) or an LMF.

6. The method of claim 5, wherein the first network node is an AMF, wherein the third network node is an LMF, wherein the handover is to the second network node, and further comprising:
   receiving the first indication of the handover from a Next Generation Radio Access Network (NG-RAN); and
   performing the handover of the emergency call to the second network node.

7. The method of claim 5, wherein the first network node is an AMF, wherein the handover is from the second network node, and further comprising:
   receiving the first indication of handover from the second network node.

8. The method of claim 5, wherein the first network node is an LMF, wherein the third network node is a GMLC, wherein the handover is from the second network node, and further comprising:
   receiving the first indication of the handover from a fourth network node, wherein the fourth network node is an AMF, wherein the fourth network node supports the first location solution, wherein the handover is performed from the second network node to the fourth network node.

9. A first network node in a wireless core network for supporting location of a user equipment (UE) according to a first location solution, the first network node comprising:
   an external interface configured to communicate with nodes in the wireless core network;
   a memory to store instructions; and
   at least one processor coupled to the external interface and the memory and configured to receive a first indication of a handover of an emergency call for the UE, wherein the handover is to or from a second network node in the wireless core network, wherein the second network node supports location of the UE according to a second location solution different from the first location solution, and to send a second indication of the handover of the emergency call to a third network node in the wireless core network, wherein the third network node supports the first location solution, wherein the second indication of the handover of the emergency call supports the first location solution and the second location solution.

10. The first network node of claim 9, wherein the wireless core network is a Fifth Generation Core Network (5GCN).

11. The first network node of claim 10, wherein the first network node is an Access and Mobility Management Function (AMF) or a Location Management Function (LMF).

12. The first network node of claim 11, wherein the second network node is an AMF.

13. The first network node of claim 12, wherein the third network node is a gateway mobile location center (GMLC) or an LMF.

14. The first network node of claim 13, wherein the first network node is an AMF, wherein the third network node is an LMF, wherein the handover is to the second network node, and the first indication of the handover is received from a Next Generation Radio Access Network (NG-RAN), the at least one processor is further configured to perform the handover of the emergency call to the second network node.

15. The first network node of claim 13, wherein the first network node is an AMF, wherein the handover is from the second network node, and the first indication of handover is received from the second network node.

16. The first network node of claim 13, wherein the first network node is an LMF, wherein the third network node is a GMLC, wherein the handover is from the second network node, and the first indication of the handover is received from a fourth network node, wherein the fourth network node is an AMF, wherein the fourth network node supports the first location solution, wherein the handover is performed from the second network node to the fourth network node.

17. A first network node in a wireless core network for supporting location of a user equipment (UE) according to a first location solution, the first network node comprising:
    means for receiving a first indication of a handover of an emergency call for the UE, wherein the handover is to or from a second network node in the wireless core network, wherein the second network node supports location of the UE according to a second location solution different from the first location solution; and
    means for sending a second indication of the handover of the emergency call to a third network node in the wireless core network, wherein the third network node supports the first location solution, wherein the second indication of the handover of the emergency call supports the first location solution and the second location solution.

18. The first network node of claim 17, wherein the wireless core network is a Fifth Generation Core Network (5GCN).

19. The first network node of claim 18, wherein the first network node is an Access and Mobility Management Function (AMF) or a Location Management Function (LMF).

20. The first network node of claim 19, wherein the second network node is an AMF.

21. The first network node of claim 20, wherein the third network node is a gateway mobile location center (GMLC) or an LMF.

22. The first network node of claim 21, wherein the first network node is an AMF, wherein the third network node is an LMF, wherein the handover is to the second network node, and further comprising:
    means for receiving the first indication of the handover from a Next Generation Radio Access Network (NG-RAN); and
    means for performing the handover of the emergency call to the second network node.

23. The first network node of claim 21, wherein the first network node is an AMF, wherein the handover is from the second network node, and further comprising:
    means for receiving the first indication of handover from the second network node.

24. The first network node of claim 21, wherein the first network node is an LMF, wherein the third network node is a GMLC, wherein the handover is from the second network node, and further comprising:
    means for receiving the first indication of the handover from a fourth network node, wherein the fourth network node is an AMF, wherein the fourth network node supports the first location solution, wherein the handover is performed from the second network node to the fourth network node.

25. A non-transitory storage medium including program code stored thereon, the program code is operable to cause at least one processor in a first network node in a wireless core network supporting location of a user equipment (UE) according to a first location solution to perform:
    receiving a first indication of a handover of an emergency call for the UE, wherein the handover is to or from a second network node in the wireless core network, wherein the second network node supports location of the UE according to a second location solution different from the first location solution; and
    sending a second indication of the handover of the emergency call to a third network node in the wireless core network, wherein the third network node supports the first location solution, wherein the second indication of the handover of the emergency call supports the first location solution and the second location solution.

26. The non-transitory storage medium of claim 25, wherein the wireless core network is a Fifth Generation Core Network (5GCN).

27. The non-transitory storage medium of claim 26, wherein the first network node is an Access and Mobility Management Function (AMF) or a Location Management Function (LMF).

28. The non-transitory storage medium of claim 27, wherein the second network node is an AMF.

29. The non-transitory storage medium of claim 28, wherein the third network node is a gateway mobile location center (GMLC) or an LMF.

30. The non-transitory storage medium of claim 29, wherein the first network node is an AMF, wherein the third network node is an LMF, wherein the handover is to the second network node, and the program code is operable to cause the at least one processor to further perform:
    receiving the first indication of the handover from a Next Generation Radio Access Network (NG-RAN); and
    performing the handover of the emergency call to the second network node.

31. The non-transitory storage medium of claim 29, wherein the first network node is an AMF, wherein the handover is from the second network node, and the program code is operable to cause the at least one processor to further perform:
    receiving the first indication of handover from the second network node.

32. The non-transitory storage medium of claim 29, wherein the first network node is an LMF, wherein the third network node is a GMLC, wherein the handover is from the second network node, and the program code is operable to cause the at least one processor to further perform:
    receiving the first indication of the handover from a fourth network node, wherein the fourth network node is an AMF, wherein the fourth network node supports the first location solution, wherein the handover is performed from the second network node to the fourth network node.

* * * * *